United States Patent
Seader

(10) Patent No.: US 11,320,024 B2
(45) Date of Patent: May 3, 2022

(54) SYSTEMS AND METHODS FOR A ROPE, FLAT-STRAP, AND BUNGEE SECURING DEVICE

(71) Applicant: Nite Ize, Inc., Boulder, CO (US)

(72) Inventor: Rex Seader, Denver, CO (US)

(73) Assignee: Nite Ize, Inc., Boulder, CO (US)

( * ) Notice: Subject to any disclaimer, the term of this patent is extended or adjusted under 35 U.S.C. 154(b) by 0 days.

(21) Appl. No.: 16/583,071

(22) Filed: Sep. 25, 2019

(65) Prior Publication Data
US 2020/0408277 A1    Dec. 31, 2020

Related U.S. Application Data

(63) Continuation-in-part of application No. 16/453,822, filed on Jun. 26, 2019, now Pat. No. 11,078,986.

(51) Int. Cl.
*F16G 11/14* (2006.01)
*E04H 15/64* (2006.01)

(52) U.S. Cl.
CPC .............. *F16G 11/14* (2013.01); *E04H 15/64* (2013.01)

(58) Field of Classification Search
CPC ...... F16G 11/14; F16G 11/143; F16G 11/103; E04H 15/64
See application file for complete search history.

(56) References Cited

U.S. PATENT DOCUMENTS

| | | | | |
|---|---|---|---|---|
| 782,657 | A * | 2/1905 | Hubert | F16G 11/00 24/131 C |
| 1,073,226 | A * | 9/1913 | Freeman | A01K 1/04 54/34 |
| 1,888,875 | A | 11/1932 | Long et al. | |
| 2,208,152 | A * | 7/1940 | Badhorn | A47G 29/10 248/303 |
| 3,751,772 | A * | 8/1973 | Grandjanny | F16G 11/143 24/115 A |
| 3,999,253 | A * | 12/1976 | Hoadley | F16G 11/046 24/115 N |
| 4,380,101 | A | 4/1983 | Joubert et al. | |
| 5,187,852 | A * | 2/1993 | Stanley | F16G 11/02 227/130 |
| 5,383,259 | A * | 1/1995 | McIntire | B62J 7/08 24/136 R |
| 5,490,650 | A * | 2/1996 | Pendergrass | A47F 5/0823 248/220.31 |
| 5,577,299 | A * | 11/1996 | Thompson | F16G 11/046 24/115 H |
| 6,014,794 | A * | 1/2000 | McCoy | B62J 7/08 24/265 H |
| 6,668,583 | B2 * | 12/2003 | O'Brien | A44C 5/18 24/128 |
| 6,868,586 | B1 | 3/2005 | Hall | |

(Continued)

OTHER PUBLICATIONS

International Search Report dated Sep. 11, 2020 issued in related PCT App. No. PCT/US2020/039195 (2 pages).

*Primary Examiner* — David M Upchurch
(74) *Attorney, Agent, or Firm* — Haynes and Boone, LLP

(57) ABSTRACT

A device for holding a cord includes a first cord holding area shaped to receive a cord. The device further includes a hook portion interconnected with the first cord holding area, the hook portion curving from a first end of the first cord holding area, around a side of the first cord holding area to a second end of the first cord holding area, opposite the first end.

28 Claims, 36 Drawing Sheets

(56) References Cited

U.S. PATENT DOCUMENTS

| | | | | |
|---|---|---|---|---|
| 7,152,837 | B1 * | 12/2006 | Babjak | F16B 45/00 |
| | | | | 248/304 |
| D561,007 | S * | 2/2008 | Kaesler | D8/354 |
| D568,145 | S * | 5/2008 | Handel | D8/370 |
| 7,780,184 | B2 | 8/2010 | Ehrenreich et al. | |
| D649,709 | S * | 11/2011 | Loman | D27/183 |
| D673,031 | S * | 12/2012 | Hendricks | D8/394 |
| D699,556 | S * | 2/2014 | Hendricks | D8/394 |
| D706,617 | S * | 6/2014 | Hendricks | D8/394 |
| 8,857,379 | B2 * | 10/2014 | Glover | A01K 15/003 |
| | | | | 119/805 |
| 10,106,369 | B2 * | 10/2018 | Makrinos | B65H 75/36 |
| 2007/0067968 | A1 * | 3/2007 | Krawczyk | F16G 11/143 |
| | | | | 24/300 |
| 2008/0172843 | A1 * | 7/2008 | Shimanski | B60P 7/0807 |
| | | | | 24/129 R |
| 2009/0223024 | A1 * | 9/2009 | Bauer | F16G 11/143 |
| | | | | 24/129 C |
| 2012/0023711 | A1 | 2/2012 | Neumann et al. | |
| 2013/0232732 | A1 * | 9/2013 | Jacobson | F16G 11/00 |
| | | | | 24/265 H |
| 2017/0057397 | A1 * | 3/2017 | Leung | F16G 11/143 |

* cited by examiner

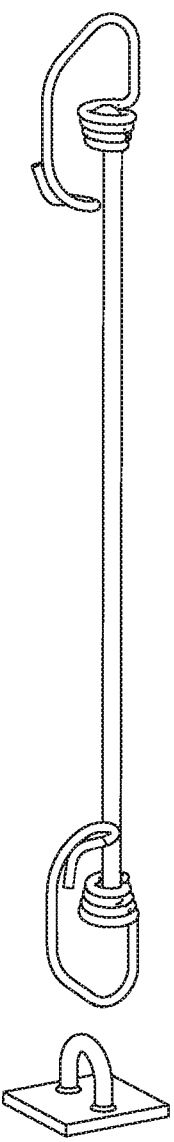
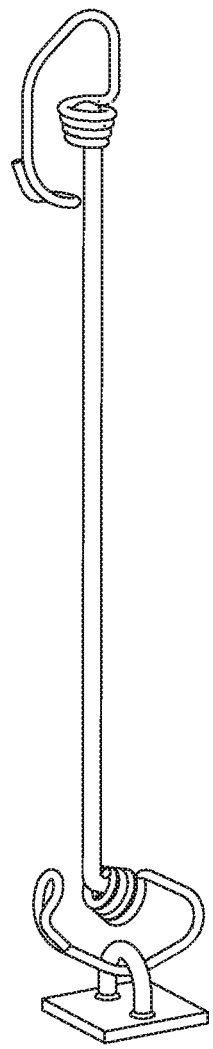
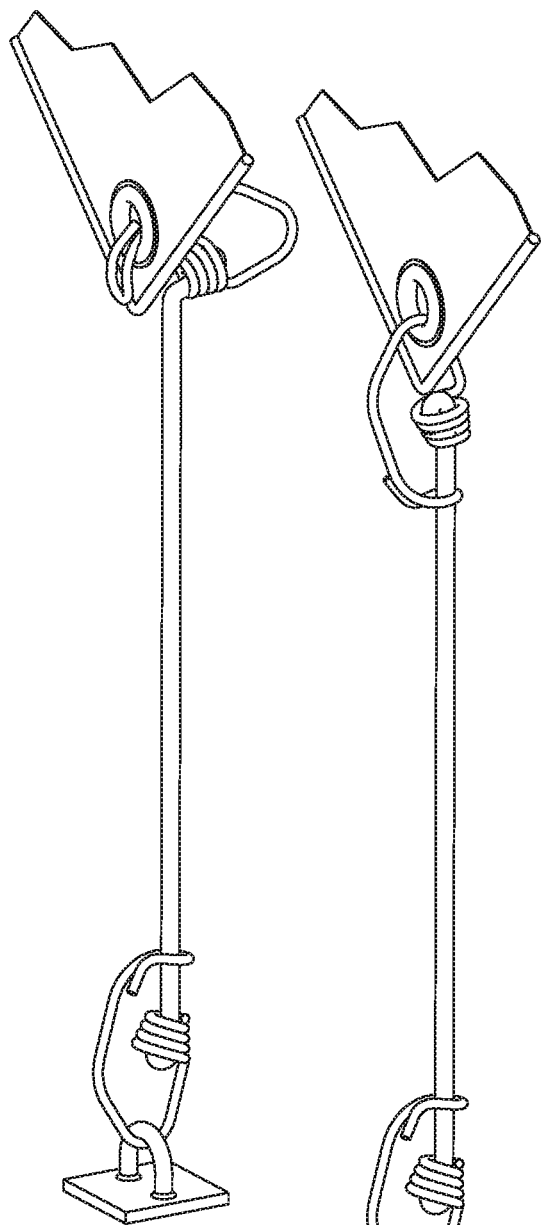
Fig. 7A
Fig. 7B
Fig. 7C
Fig. 7D

SYSTEMS AND METHODS FOR A ROPE, FLAT-STRAP, AND BUNGEE SECURING DEVICE

CROSS-REFERENCE TO RELATED APPLICATIONS

This application is a continuation-in-part of U.S. patent application Ser. No. 16/453,822 filed Jun. 26, 2019, which is incorporated herein by reference in its entirety.

BACKGROUND

In many scenarios, it is desirable to secure a rope, bungee, or flat strap to a point or other location. There are many reasons for this, including holding tarps, tents, loads, and many others. Currently, there are many solutions to these issues, but none of them combine simplicity and releasable but secure holding. Therefore, consumers desire such a solution.

BRIEF SUMMARY

In one embodiment, a device for holding a cord includes a first cord holding body, the first cord holding body holding the cord. The device further includes a hook portion interconnected with the first cord holding area, the hook portion curving from a first end of the first cord holding area, around a side of the first cord holding area to a second end of the first cord holding area, opposite the first end. In one alternative, the first cord holding body is molded around the cord. In another alternative, the cord includes a crimp that is molded around by the first cord holding body. Alternatively, the first cord holding body is molded around a securing portion of the hook portion. In another alternative, the securing portion is oriented in the first cord holding body such that the crimp is oriented to cross the securing portion within the first cord holding body. Alternatively, the first cord holding body includes a groove and a securing portion of the hook portion is oriented in the groove. In another alternative, the securing portion is bent around the first cord holding body. Alternatively, the securing portion is oriented around the first cord holding body such that the crimp is oriented to cross the securing portion within the first cord holding body. In another alternative, the hook portion includes a first capture area, the first capture area shaped to capture the cord, the first capture area located at an end of the hook portion on the second end of the first cord holding area. Alternatively, the hook portion includes an apex and the apex is inline with the first cord holding area, such that the cord is inline with the apex.

In one embodiment, a tensioning device includes a cord and a cord holding device. The cord holding device includes, a first cord holding body, the first cord holding body holding the cord. The device further includes a hook portion interconnected with the first cord holding area, the hook portion curving from a first end of the first cord holding area, around a side of the first cord holding area to a second end of the first cord holding area, opposite the first end, wherein the hook portion includes a first capture area, the first capture area shaped to capture the cord and removably capturing the cord, the first capture area located at an end of the hook portion on the second end of the first cord holding area. In one alternative, the first cord holding body is molded around the cord. In another alternative, the cord includes a crimp that is molded around by the first cord holding body. Alternatively, the first cord holding body is molded around a securing portion of the hook portion. In another alternative, the securing portion is oriented in the first cord holding body such that the crimp is oriented to cross the securing portion within the first cord holding body. Alternatively, the first cord holding body includes a groove and a securing portion of the hook portion is oriented in the groove. In another alternative, the securing portion is bent around the first cord holding body. Alternatively, the securing portion is oriented around the first cord holding body such that the crimp is oriented to cross the securing portion within the first cord holding body. In another alternative, the hook portion includes an apex and the apex is inline with the first cord holding area, such that the cord is inline with the apex. Alternatively, the cord is a bungee cord.

In one embodiment, a method of locking down a bungee cord includes providing a cord holding device. The cord holding device includes a first cord holding body, the first cord holding body holding the cord. The cord holding device includes a hook portion interconnected with the first cord holding area, the hook portion curving from a first end of the first cord holding area, around a side of the first cord holding area to a second end of the first cord holding area, opposite the first end, wherein the hook portion includes a first capture area, the first capture area shaped to capture the cord and removably capture the cord, the first capture area located at an end of the hook portion on the second end of the first cord holding area. The method further includes placing the hook portion around an anchor point. The method further includes capturing the cord in the first capture area.

In one embodiment, a device for holding a cord includes a first cord holding area shaped to receive a cord. The device further includes a hook portion interconnected with the first cord holding area, the hook portion curving from a first end of the first cord holding area, around a side of the first cord holding area to a second end of the first cord holding area, opposite the first end. In one alternative, the first cord holding area includes an aperture for the cord to pass through. In another alternative, the first cord holding area is a cylinder formed from a coiled wire. Alternatively, the hook portion includes a first capture area, the first capture area shaped to capture the cord, the first capture area located at an end of the hook portion on the second end of the first cord holding area. Optionally, the hook portion includes an apex and the apex is inline with the first cord holding area, such that the cord is inline with the apex. In another alternative, the first cord holding area includes a crossbar for looping the cord around.

In one embodiment, a device for holding a flat strap includes a first strap holding area shaped to receive a strap. The device further includes a first hook portion interconnected with the first strap holding area, the first hook portion curving from a first end of the first strap holding area, around a side of the first strap holding area to a second end of the first strap holding area, opposite the first end. In one alternative, the first strap holding area includes an aperture for the strap to wrap around. In another alternative, the first strap holding area is triangular shaped area. Alternatively, the first hook portion includes a first capture area, the first capture area shaped to capture the strap, the first capture area located at an end of the first hook portion on the second end of the first strap holding area. In one alternative, the device further includes a second hook portion, wherein the second hook portion includes a second capture area, the second capture area shaped to capture the strap, the second capture area located at an end of the second hook portion on the second end of the first strap holding area, the second hook portion curving from the first end of the first strap holding area, around the side of the first strap holding area to the second end of the second strap holding area, opposite the first end. Alternatively, the first hook portion includes an apex and the apex is inline with the first strap holding area, such that the strap is inline with the apex.

In one embodiment, a tensioning device includes a cord and a cord holding device. The cord holding device includes a first cord holding area shaped to receiving the cord. The cord holding device further includes a hook portion interconnected with the first cord holding area, the hook portion curving from a first end of the first cord holding area, around a side of the first cord holding area to a second end of the first cord holding area, opposite the first end. The hook portion includes a first capture area, the first capture area shaped to capture the cord and removably capturing the cord, the first capture area located at an end of the hook portion on the second end of the first cord holding area. Alternatively, the first cord holding area includes an aperture for the cord to pass through and the first cord holding area is a cylinder formed from a coiled wire. In one alternative, the hook portion includes an apex and the apex is inline with the first cord holding area, such that the cord is inline with the apex. Alternatively, the first cord holding area includes a crossbar for around which the cord is looped. In another alternative, the tensioning device further includes a clamp lock oriented on the cord where the first capture area engages the cord, the clamp lock having a first and second channel, each containing a first and second portion of the cord respectively. Alternatively, the cord capture area engages a portion of the clamp lock, releasably holding the first and second portion of the cord in the first and second channel. In one alternative, the cord is a bungee cord. In another alternative, the first and second channel have a circular cross section. Alternatively, the first and second channel have a cross section corresponding to the shape of a flat strap.

In one embodiment, a method of locking down a bungee cord includes providing a cord holding device. The cord holding device includes a first cord holding area shaped to receiving the cord. The cord holding device includes a hook portion interconnected with the first cord holding area, the hook portion curving from a first end of the first cord holding area, around a side of the first cord holding area to a second end of the first cord holding area, opposite the first end, wherein the hook portion includes a first capture area, the first capture area shaped to capture the cord and removably capture the cord, the first capture area located at an end of the hook portion on the second end of the first cord holding area. The method further includes placing the hook portion around an anchor point. The method further includes capturing the cord in the first capture area.

In one embodiment, a device for holding a cord includes a first cord holding body, the first cord holding body holding the cord. The device further includes a hook portion interconnected with the first cord holding area, wherein the hook portion includes a first capture area, the first capture area shaped to capture the cord, the first capture area located at an end of the hook portion. Alternatively, the first capture area engages the cord, such that when the cord is bent, a portion of the cord entering the first cord holding body does not shift. In one alternative, a portion of the cord enters the first cord holding body in a first portion and the first capture area engages the cord, such that when the cord is bent, the cord maintains the first position. In another alternative, the first position is an angle perpendicular to an edge of the first cord holding body.

In one embodiment, a tensioning device includes a cord and a first cord holding body, the first cord holding body holding the cord. The device further includes a hook portion interconnected with the first cord holding area, wherein the hook portion includes a first capture area, the first capture area shaped to capture the cord, the first capture area located at an end of the hook portion. Alternatively, a portion of the cord enters the first cord holding body in a first portion and the first capture area engages the cord, such that when the cord is bent, the cord maintains the first position. In one alternative, the first position is an angle perpendicular to an edge of the first cord holding body.

BRIEF DESCRIPTION OF THE DRAWINGS

FIGS. 7A-7D are a series of isometric views showing the progression for securing the securing device affixed on each end of a bungee cord.

DETAILED DESCRIPTION

Certain terminology is used herein for convenience only and is not to be taken as a limitation on the embodiments of the systems and methods a rope, flat-strap, and bungee securing device. Generally, various embodiments of these securing devices may be modified to work with a rope, bungee, or flat-strap webbing. Therefore, although certain embodiments are described in relation to one or more of a rope, bungee, or flat-strap webbing, however they may be modified to work with other embodiments.

Figure 1:
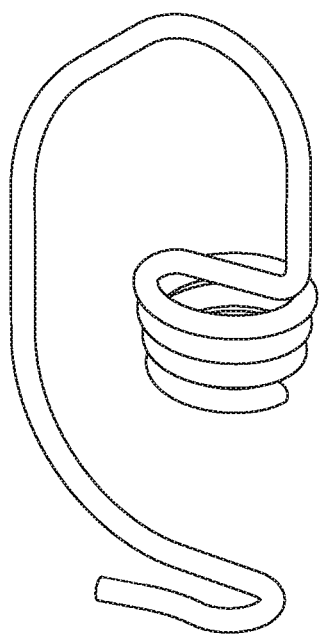
FIG. 1 shows one embodiment of a securing device.
Figure 2:
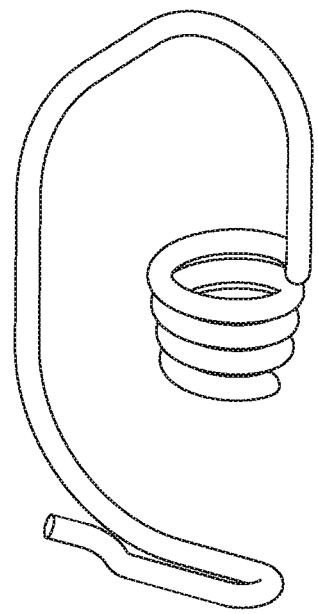
FIG. 2 shows another embodiment of a securing device.
Figure 3:
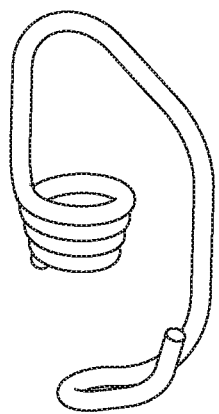
FIG. 3 shows another embodiment of a securing device.
Figure 4:
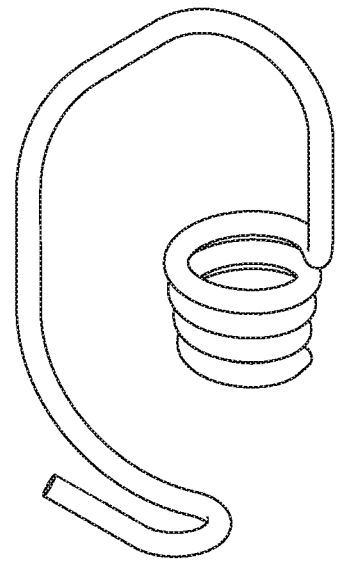
FIG. 4 shows another embodiment of a securing device.

FIG. 1 shows one embodiment of a securing device 100A. FIG. 2 shows another embodiment of a securing device 100B, FIG. 3 shows an embodiment of a securing device 100C, and FIG. 4 shows an embodiment of a securing device 100D. Securing device 100A differs from securing devices 100B, 100C, 100D in that securing device 100A includes a top bar 101 that provides for an anchor point that a bungee or rope may be run over and back. Securing device 100A is used on the adjustable end of both the flat and the round adjustable bungee cords. The embodiment securing device 100A is different from the other hook embodiments in that there is a section of wire forming a 'top bar' across the spiral coil. This feature acts as a static pulley and is the means by which the length of the bungee cords can be adjusted. Securing device 100B is used for fixed length flat bungee cords and the non-adjustable end of the adjustable flat bungee cord. Securing device 100C (5 mm) and securing device 100D (8 mm) represent embodiments for fixed length round bungee cords and are used for the non-adjustable end of the adjustable round bungee cord.

The various securing devices are generally similar except as described above and they will be generally described in relation to securing device 100B. Securing device 100B is connected to a bungee cord 110 (not shown here but in FIGS. 5 and 6). Securing device 100B includes a bungee capture area 115. In many embodiments, capture area 115 may be a wire coil, but the design is not so limited. Generally, bungee capture area 115 is a twisted portion of securing device 100 such that a narrowing cylindrical body is created. Bungee cord 110 is knotted or folded and stapled or otherwise thickened at area 116 such that it may not pass through the apertures of capture area 115. Other configurations are possible, but the point is to provide an area for securing bungee cord 110 in securing device 100B. Additionally, due to the cylindrical body, the bungee cord 110 is held in a particular in-line orientation with the body of the device. Securing device 100B further includes a hook 120. Hook 120 includes an apex 121. Apex 121 is located such that the bungee cord 110 in capture area 115 is held inline with the apex 121. Therefore, in operation, a point to which the securing device is attached will tend to rest at apex 121 as it is the further point from bungee cord 110. Hook 120 continues such that a portion of hook 120, portion 125 extends back toward bungee cord 110, such that it is past capture area 115. Portion 125 terminates in a second capture area 130. Capture area 130 is sized such that it may capture bungee cord 110 at portion 140. Capture area 130 is generally narrower than the width of bungee cord 110 and therefore traps bungee cord 110 via compression. The tip 145 of portion 140 is bent such that the opening is obtuse and the tip 145 ramps the bungee cord portion 140 to the capture area 130. Therefore, in operation, capture area 130 may be released from bungee cord portion 140 and the securing device 100 may be connected to a point. After connection, the point will naturally migrate to apex 121 under tension, since this point is the farthest extending point. Subsequently, capture area 130 may be engaged with bungee cord portion 140 to prevent release. In many configurations, securing device 100B is constructed of a coated wire or piece of metal. Typically, the wire is coated with rubber or plastic or similar materials. High tension capture area 130 will tend to be pulled against the strap/bungee/cord running through the high tension capture area 130, such that the strap/bungee/cord is unlikely to release, thus limiting distortions that would otherwise tend to unbend the hook at the apex 121 of the hook.

Figure 5:
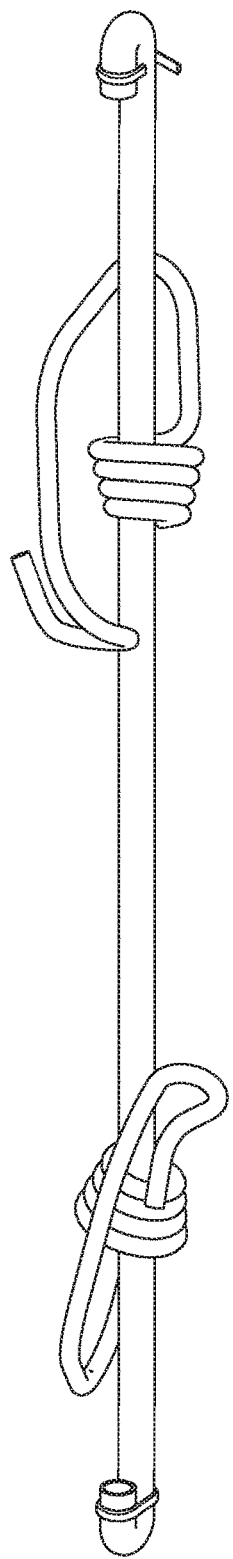
FIGS. 5 and 6 show the assembly procedure for creating a fixed length bungee cord using an embodiment of a securing device.
Figure 6:
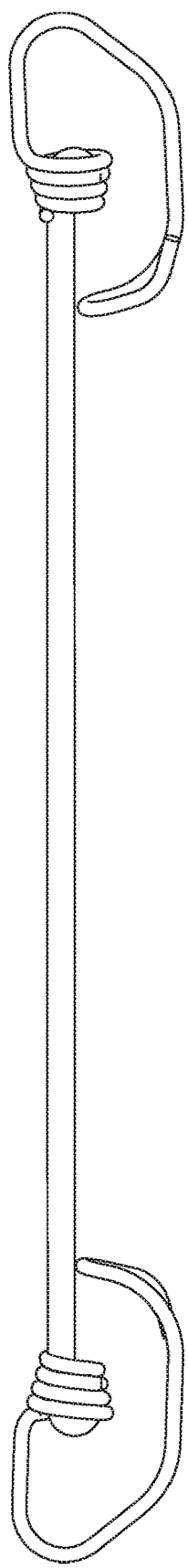

FIGS. 5 and 6 show the assembly procedure for creating a fixed length bungee cord. Two securing devices 100B are slid onto the bungee cord, oriented in opposing directions, while a metal brad is secured around the folded over cord end. The securing devices slide back to the ends of the bungee cord and are held captive to the bungee cord by the metal brads affixed to each bungee cord end. The cords ends are constrained within the wire form coil on each hook. FIG. 5 shows the securing device 100B integrated with bungee cord 110. In this view, area 116 of bungee cord 110 is shown. In this case, it is folded over and crimped with a metal piece, such that it is too wide to pass through capture area 115. FIG.

6 shows the securing device at either end of a bungee cord, such that it may be engaged at portion 140 with capture area 130.

FIGS. 7A-7D are a series of isometric views showing the progression for securing the securing device affixed on each end of a bungee cord to a base anchor or tied down point 710 on one end and to an eyelet of a tarp on the other end. After attaching to the base anchor and the tarp, each hook is subsequently secured back to the bungee cord by means of the small loop, capture area 130, at the end of the extended arm on each of the securing devices. Using the securing devices in this manner prevents any inadvertent release from the base anchor or from the tarp, even when the bungee cord experiences a slack condition. More specifically, FIGS. 7A-7D show how the securing device in operates in the context of a tie down point and a tarp (or tent). In FIG. 7A securing devices 100B and associated bungee cord 110 are in a non-attached configuration with tie down point 710. In FIG. 7B the lower securing device 100 is rotated and passed through the aperture of tie down point 710. Then, as shown in FIG. 7C, the lower securing device 100B is rotated to an inline position and capture area 130 is engaged with portion 140 of bungee cord 110. Additionally, upper securing device 100B may be rotated and passed through the grommet 725 of tarp 720 (or tent portion). Then, as shown in FIG. 7D, the upper securing device 100B is rotated to an inline position and capture area 130 is engaged with portion 140 of bungee cord 110.

Figure 8A:
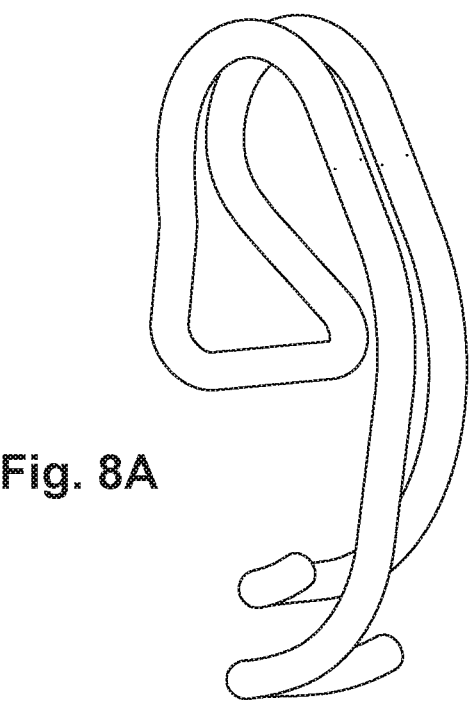
FIGS. 8A-8C shows three views of an embodiments of device for use with webbing/flat straps.
Figure 8B:
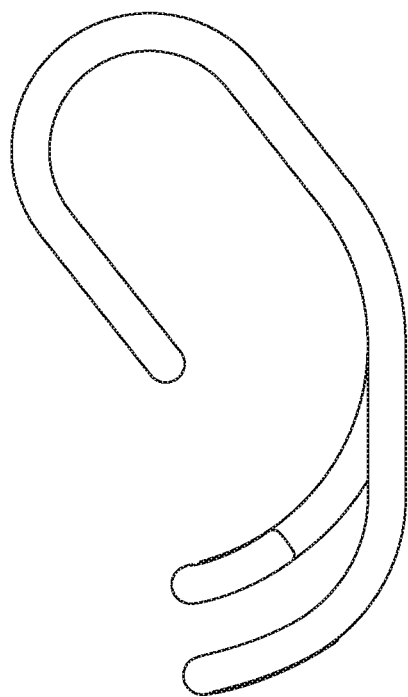
Figure 8C:
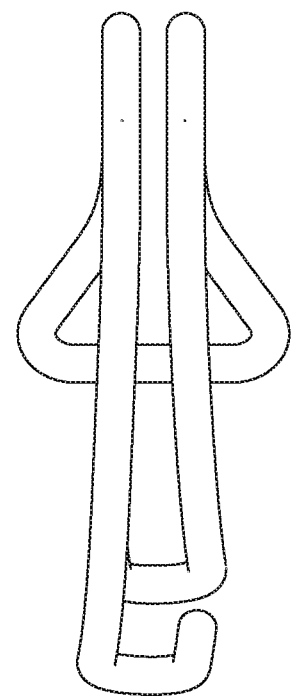

FIG. 8A shows another embodiment of a securing device 800. Generally, FIGS. 8A-8C provide three views of a device for use with webbing/flat straps. The figures are of the securing device only, shown without conformal coating. In some embodiments, the securing devices have selected areas having conformal coating. Securing device 800 is designed to be attached to a flat strap, not shown in this figure. Generally, securing device 800 is formed out of a piece of cylindrical metal that is coated in rubber or plastic. The metal wire or cylindrical piece is bent or formed to create the shape shown. Securing device 800 includes a flat strap loop 810. Flat strap loop 810 is formed to receive a flat strap such that it may lie flat against edge 811. Securing device 800 further includes two hooks 820a, 820b. These hooks are of different lengths and stretch different distances from flat strap loop 810. The hooks 820a, 820b include capture areas 830 for capturing a flat strap in a folded or compressed configuration. The capture areas 830 are shaped such that they provide compression and friction to a flat strap, preventing the flat strap from releasing. Furthermore, bend 840 is designed such that the edge 811 of flat strap loop 810 is approximately inline with the apex 841 of the bend 840. Therefore, a point (an attachment point) will naturally come to rest at the apex 841 when the device is under tension. FIGS. 8B-C show additional views of securing device 800. In FIG. 8B it is especially visible that apex 841 is in line with edge 811 and the openings of capture areas 830, such that all three are roughly on the same straight line.

Figure 9A:
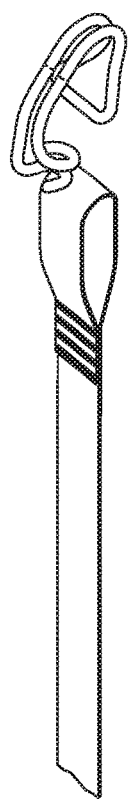
FIGS. 9A-9F show a series of figures that depict the attachment of an embodiment of a securing device on a flat strap.
Figure 9B:
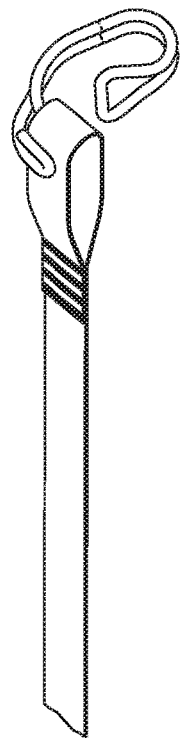
Figure 9C:
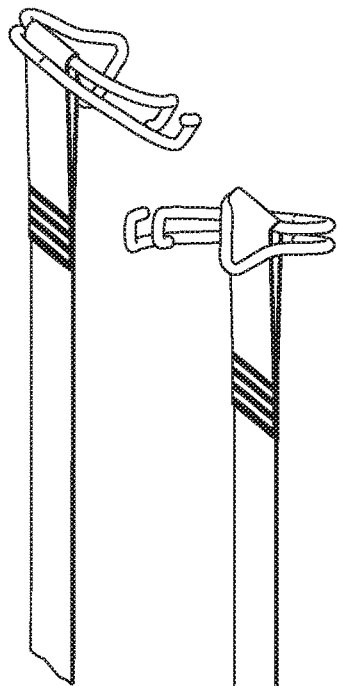
Figure 9D:
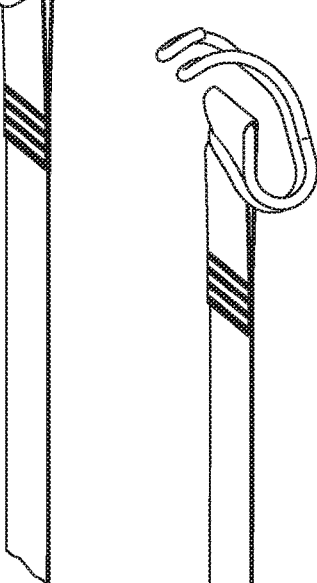
Figure 9E:
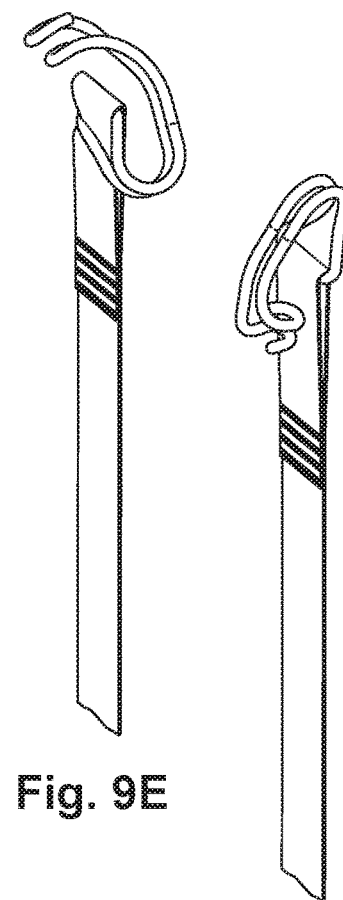
Figure 9F:
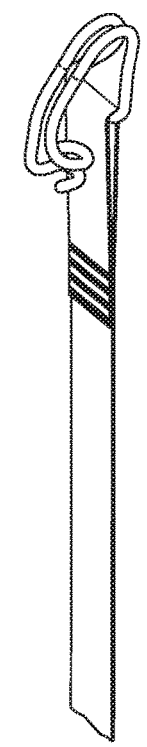

FIGS. 9A-9F show a series of figures that depict the attachment of the securing device 800 being placed on a flat strap 900. In FIG. 9A securing device 800 is free from the sewed loop 910 of flat strap 900. In FIG. 9B, one of the hooks 820A is passed from sewed loop 910. Then, in FIG. 9C the sewn loop is passed further along hook 820A. In FIG. 9D, securing device 800 is passed to flat strap loop 810. This process is completed in FIGS. 9E and 9F and the device is rotated into position.

Figures 10A, 10B, 10C, 10D, 10E, 10F:
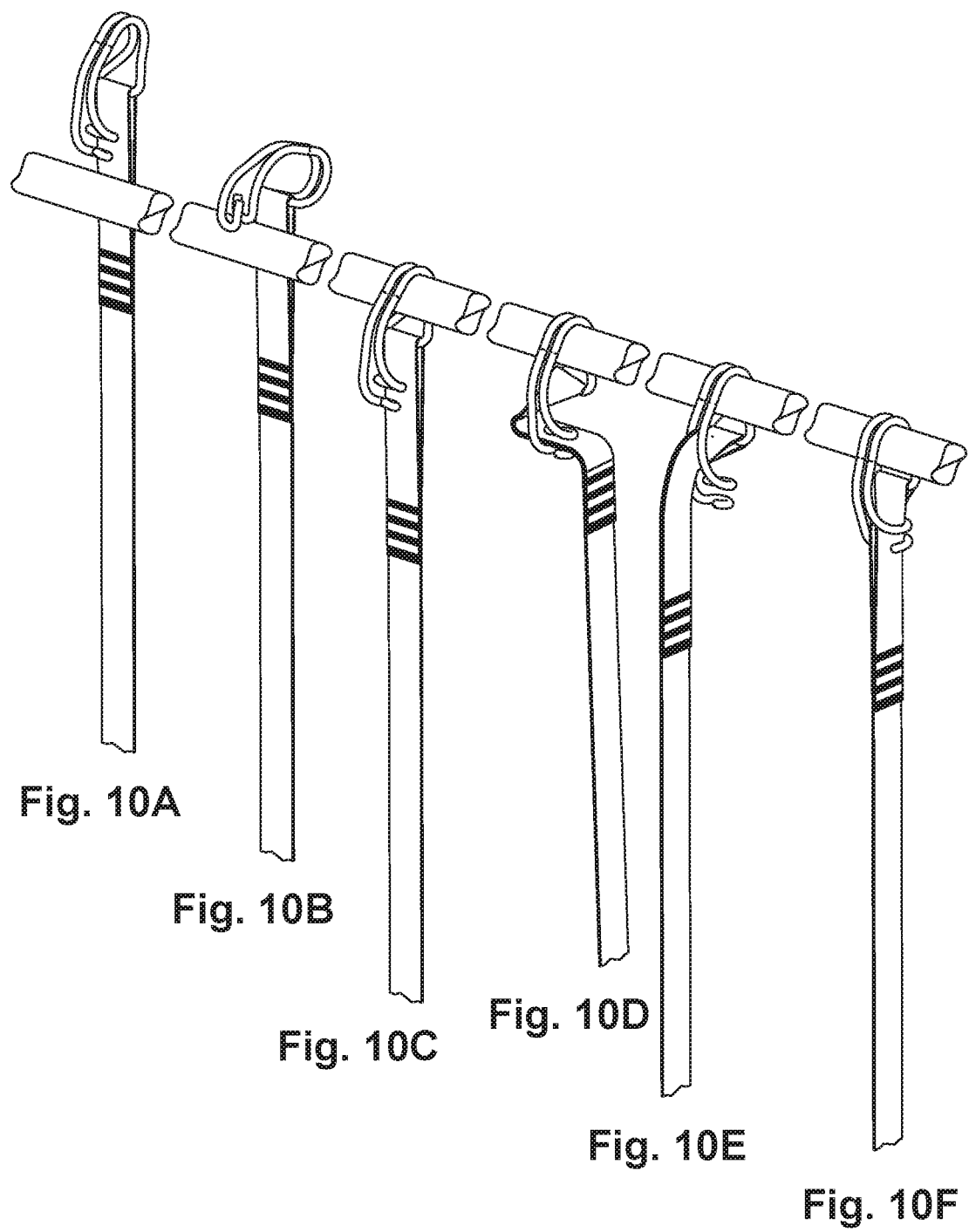
FIGS. 10A through 10F show a series of figures providing for the attachment of an embodiment of a securing device to a fixed point.

FIGS. 10A through 10F show a series of figures providing for the attachment of the device to a fixed point 1000. In FIG. 10A securing device 800 is free from fixed point 1000. In FIG. 10B, the securing device 800 is rotated and in FIG. 10B it is placed on the fixed point 1000. In FIG. 10D, flat strap 900 is gathered 1010 for placement in capture areas 830. In FIG. 10E the flat edge of the flat strap 900 is pushed into capture areas 830. Subsequently, the flat strap 900 is pulled flat such that it rests in capture areas 830 in a trapped position 1030. Generally, FIGS. 10A through 10F, are an isometric series showing the securing device and strap being secured to an anchor location. The means by which the webbing is configured in the securing device prevents the securing device from being inadvertently removed from the anchor location. To remove the securing from the anchor, the progression is to be reversed. Note, the webbing faces in the direction of the anchor axis.

Figures 11A, 11B, 11C:
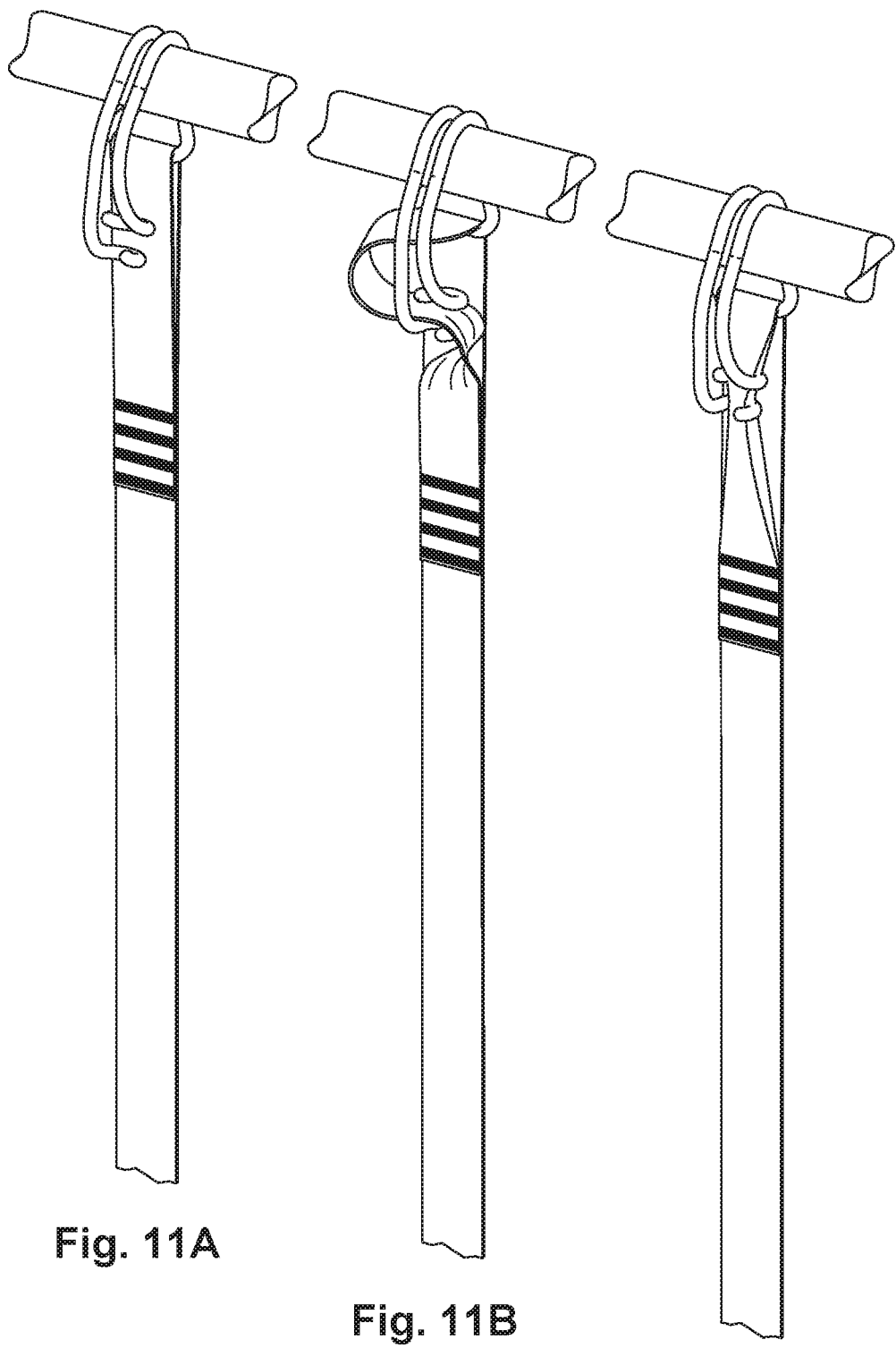
FIGS. 11A through 11C show a series of figures providing for the attachment of an embodiment of a securing device to a fixed point.

FIGS. 11A through 11C show a series of figures providing for the attachment of the device to a fixed point 1000. In FIG. 11A securing device 800 is on fixed point 1000. In FIG. 10B, one side of the sewed loop 910 is gathered 1110 for placement in capture areas 830. In FIG. 10C one side of the sewed loop 910 is pushed into capture areas 830. Generally, FIGS. 11A through 11C, are an isometric series showing the securing device and strap being secured to an anchor location. The means by which the webbing is configured in the securing device prevents the securing device from being inadvertently removed from the anchor location. To remove the securing device from the anchor, the progression is to be reversed. Note, the webbing faces perpendicular to the anchor axis.

Figures 12A, 12B, 12C:
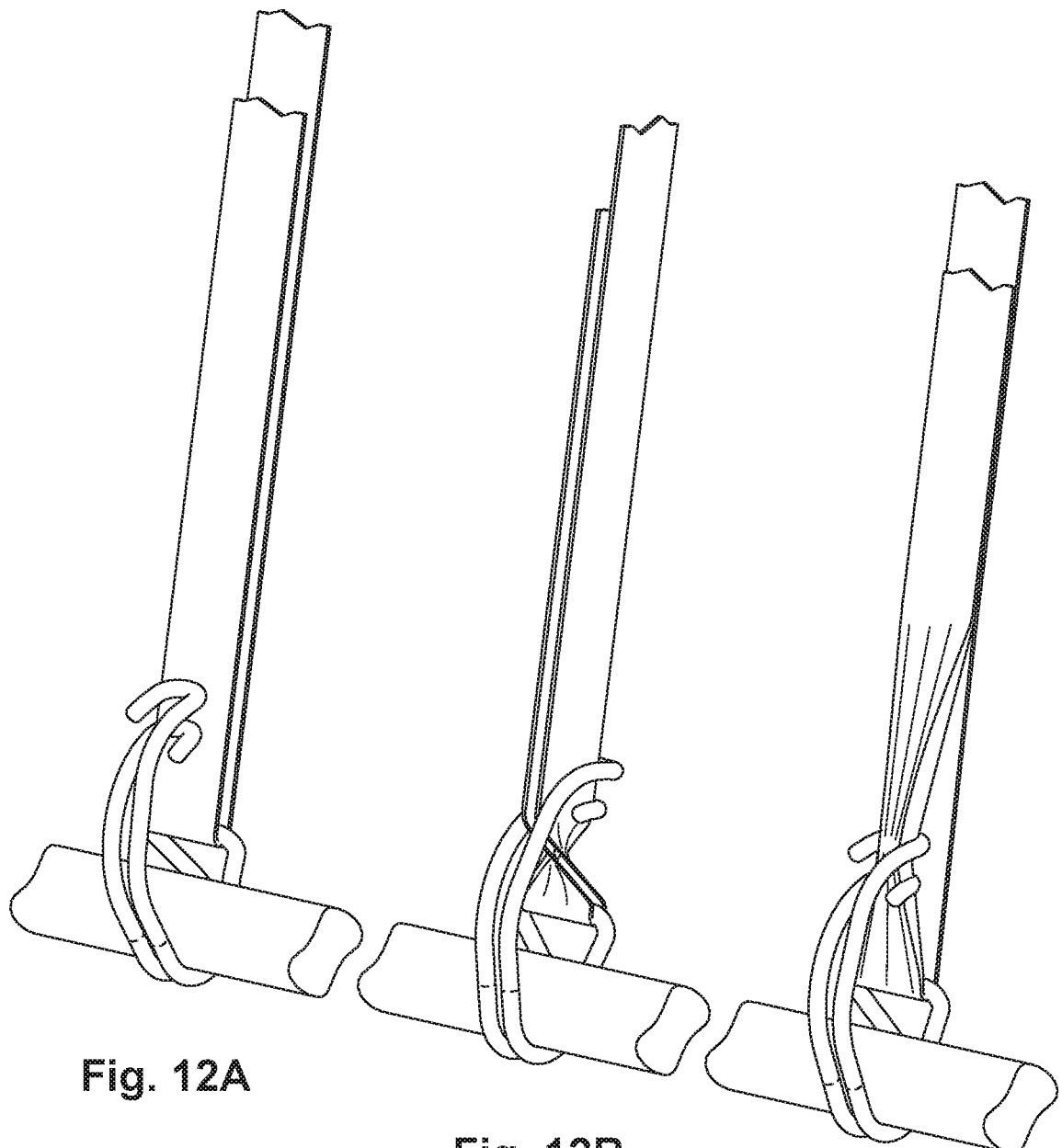
FIGS. 12A through 12C show a series of figures providing for the attachment of an embodiment of a securing device to a fixed point in a configuration where there is no sewed loop.

FIGS. 12A through 12C show a series of figures providing for the attachment of the device to a fixed point 1200 in a configuration where there is no sewed loop 910 and the user desires to tighten and loosen the flat straps. In FIG. 12A securing device 800 is on fixed point 1200 with strap 1210 run through flat strap loop 810, but not fixed in place. In FIG. 12B, the flat strap 1210 is gathered for placement in capture areas 830. In FIG. 12C, first one side 1230 of the flat strap 1210 is pushed into capture areas 830 and then the other. In this configuration, the flat strap 1210 may be freed from capture areas 830 and pulled on in order to tighten the flat straps. FIGS. 12A through 12C show isometric views of different ways to route webbing through the securing device. Note, the webbing is this case is not a sewn end-loop, but rather is configured to allow the hook to serve as a static pulley as webbing is drawn through the securing device. In each, FIG. 12A thru 12C, the webbing is free to move through the device as configured, rather than being held in a static position as is the case when the hook is attached to a strap with a sewn end-loop.

Figure 13:
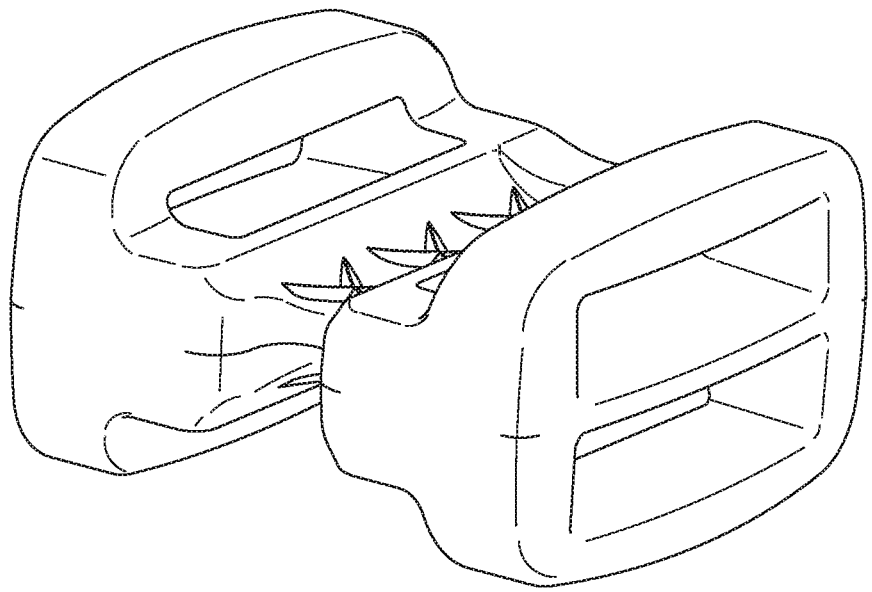
FIGS. 13 and 14 are embodiments of a sliding clamp lock used to enable the adjustability in length of an adjustable bungee cord assembly.
Figure 14:
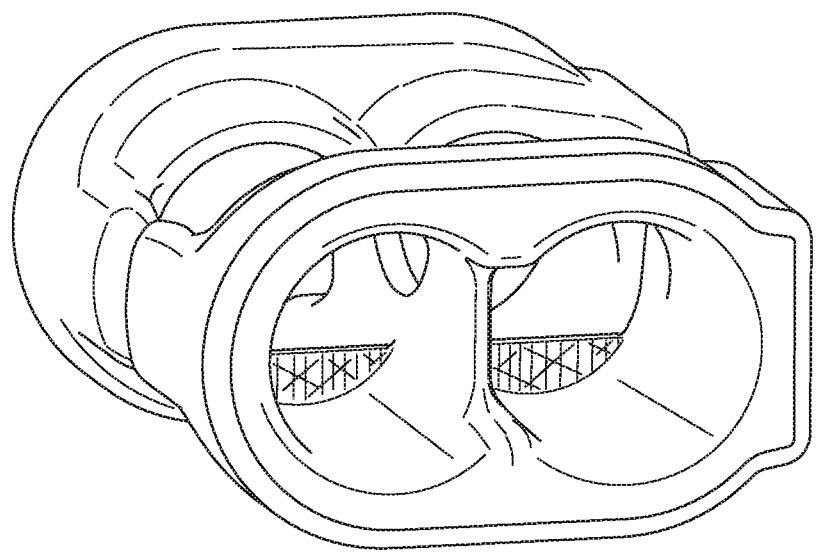
Figure 15:
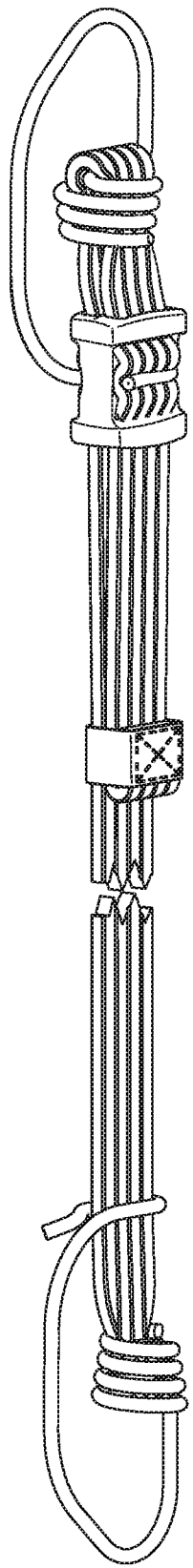
FIGS. 15 and 16 show embodiments of an adjustable bungee assembly.
Figure 16:
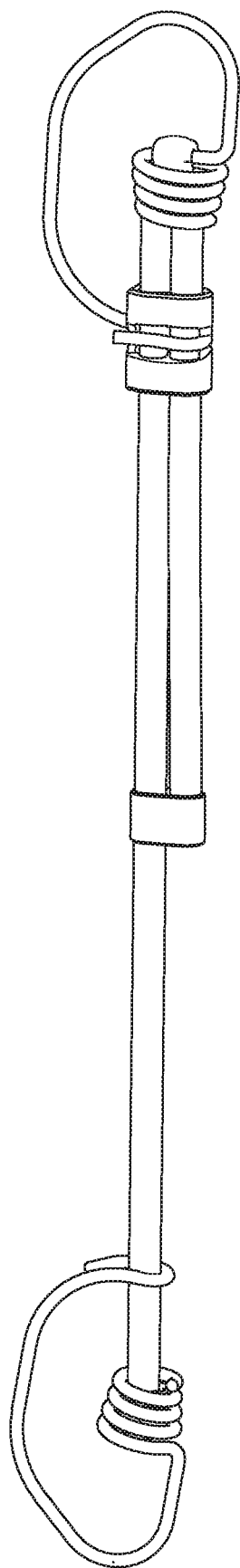

FIGS. 13 and 14 are embodiments of a sliding clamp lock used to enable the adjustability in length of an adjustable bungee cord assembly (FIG. 15, FIG. 16). The embodiment of a sliding clamp lock 1310 of FIG. 13 is generally used for bungee cords flat in cross section while the embodiment in FIG. 14 is used for bungee cords round in cross section. While somewhat different in specific features, both clamp lock embodiments work similarly by constraining the bungee cord, preventing any movement of the bungee cord through the clamp lock, whenever the clamp lock is inserted into the small wire form loop residing at the end of the extended arm on the hook.

Each clamp lock 1310, 1410 has two channels 1320, 1330, 1420, 1430, separating and permanently securing two sections of the bungee cord within the clamp lock. One leg of the bungee cord is under load while the other comprises the non-loaded leg exiting the clamp lock as the free end of the bungee cord. An exposed opening along the length of each style of the clamp lock allows the wire form to directly contact the bungee cord. As a consequence, when the clamp lock in inserted into the small wire form loop of the extended arm on the hook, the wire form section of the hook contacting the bungee cord compresses the bungee cord against a rigid surface of the clamp lock. In the case of the round bungee cord clamp lock 1410, the bungee cord is pressed into rigid standing ribs 1440 located on the back surface of each channel of the clamp lock. In the case of the flat bungee cord clamp lock 1310, the bungee cord is pressed into undulating rigid standing ribs 1350 sandwiched at the narrow portion 1340 between each of the bungee cords. End openings in each embodiment of the clamp lock secure the clamp to the bungee cord while allowing passage of the bungee cord through the clamp lock whenever the clamp lock is not secured to the wire form hook.

When the clamp lock 1310, 1410 is withdrawn from the small loop of the hook arm (capture area 130), the bungee cord can be drawn through the clamp lock 1310, 1410 in either direction, thus shortening or lengthening the distance between the securing device permanently affixed at one end of the bungee cord, and the securing device to which the clamp lock 1310, 1410 is removably secured.

FIG. 15 depicts an adjustable length embodiment utilizing flat bungee cord 1520 and FIG. 16 depicts an adjustable length embodiment utilizing round bungee cord 1620. Both embodiments are shown in a locked configuration where the length of the non-stretched bungee cord remains fixed. The length, or the distance between the securing devices 1540, 1640, can be altered in each embodiment by withdrawing the clamp lock 1310, 1410 from its respective hook (capture area 1510, 1610), drawing bungee cord through the clamp lock 1310, 1410 in either direction, then reinserting the clamp lock 1310, 1410 into the capture area 1510, 1610 residing at the end of the extended arm of the securing device 1540, 1640. Note, the length and or the tension of the bungee cord can be adjusted when the bungee is in a relaxed state or when the bungee is already secured to fixed position anchors (not shown). Also, the free end of the bungee cord is shown bound to the load bearing bungee cord by means of a sleeve 1530, 1630 affixed to the free end of the cord. The sleeve allows the free end of the bungee cord to move relative to the load bearing bungee cord while simultaneously securing the free end to the load bearing bungee cord, thus preventing the free end from flailing around.

Figure 17:
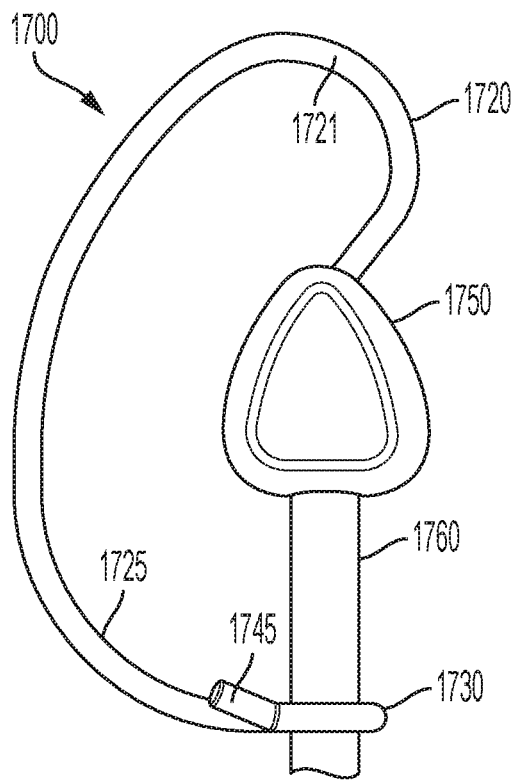
FIG. 17 depicts another embodiment of a securing device.
Figure 18:
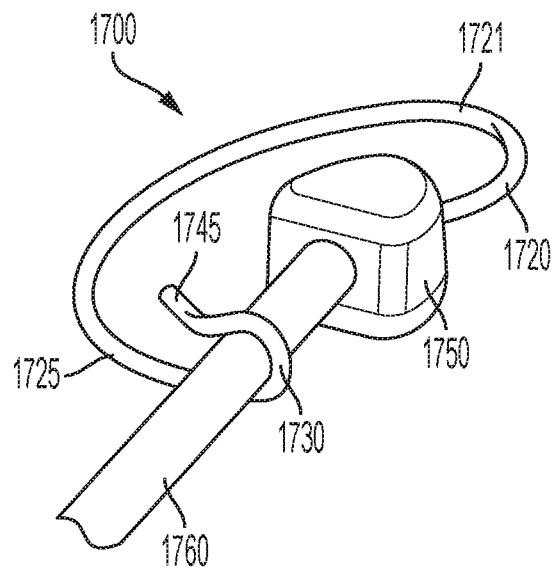
FIG. 18 shows an alternative view of securing device of FIG. 17.
Figure 19:
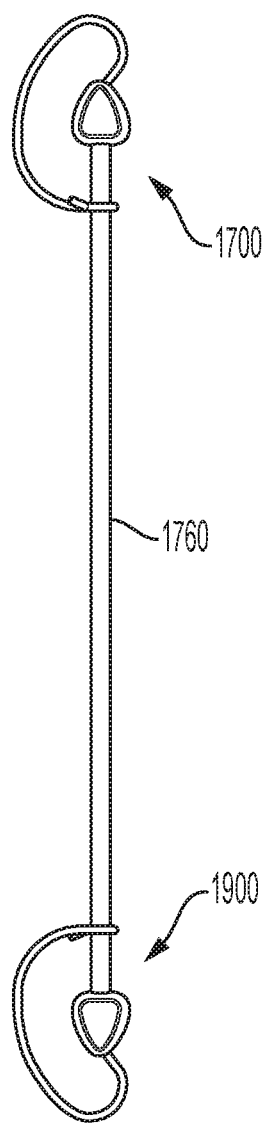
FIG. 19 shows a view of a securing device of FIG. 17 on one end of a bungee and a similar securing device on the other end.

FIG. 17 depicts another embodiment of a securing device 1700. Hook 1720 has been molded into body portion 1750. Body portion 1750 may be formed of plastic or similar material. Alternatively, body portion 1750 may be formed of other materials such as wood or metal, or any other suitable material. Similar to as in previous embodiments, hook 1720 includes apex 1721 and includes a lower area 1725 that terminates in capture area 1730. Similar to above, the tip 1745 of the capture area 1730 is bent such that it ramps the bungee to the capture areas 1730. In this way bungee 1760 may be captured by hook 1720. FIG. 17 depicts another embodiment of a securing device 1700. FIG. 18 shows an alternative view of securing device 1750. FIG. 19 shows a view of a securing device 1700 on one end of a bungee 1760 and a similar securing device 1900 on the other end. This device is intended for 5 mm round bungees.

Figure 20:
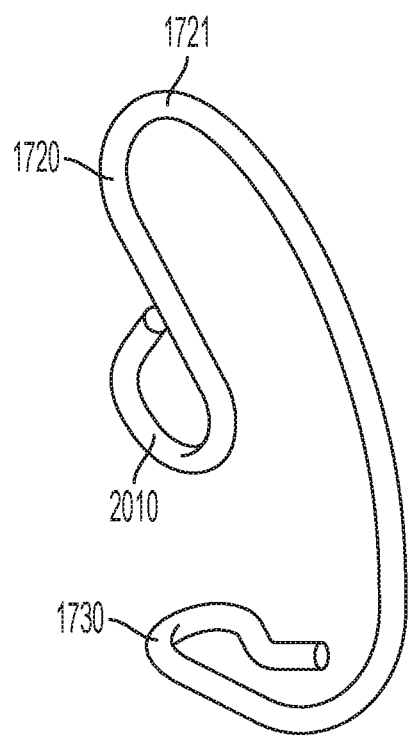
FIG. 20 shows one embodiment of hook with the inner loop exposed.
Figure 21:
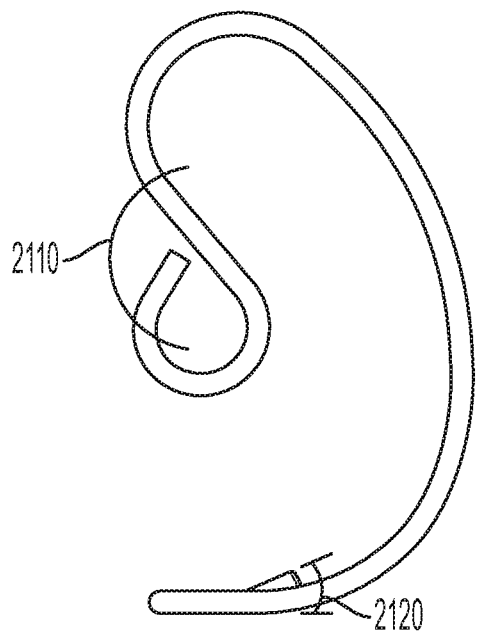
FIG. 21 shows another view of the hook of FIG. 20.

FIG. 20 shows one embodiment of hook 1720 with the inner loop 2010 exposed. This inner loop 2010 is oriented and designed to keep hook 1720 in place inside of body portion 1750. Alternative loop structures or similar structures are possible. The idea is to provide a non-linear structure, to prevent the hook 1720 from siding out of the body portion 1750 or being easily dislodged from the body portion 1750. Additionally, the inner loop 2010 is generally positioned to physically interact with a crimp or other feature on the bungee 1760, such that when the bungee is pulled, the force is either directly or indirectly resisted by the inner loop 2010, so that the body portion does not break or deteriorate as easily. FIG. 21 shows another view of hook 1720. Here angle 2110 and 2120 are visible. Generally, many different angles are possible but in the shown configuration, angle 2110 is approximately 107 degrees and angle 2120 is approximately 21 degrees. These angles may vary significantly, for example from 60 degrees to 180 degrees and from zero degrees (or even negative relative to the current position) to 90 degrees.

Figure 22:
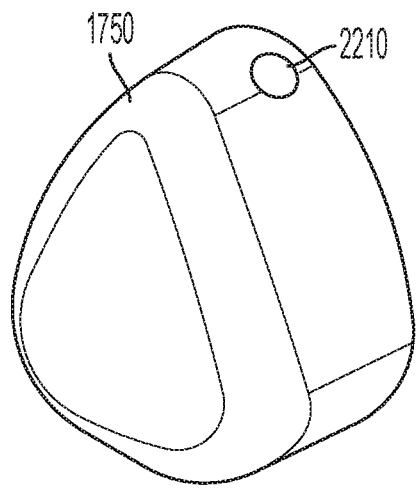
FIG. 22 shows one embodiment of the body portion used with a hook.
Figure 23:
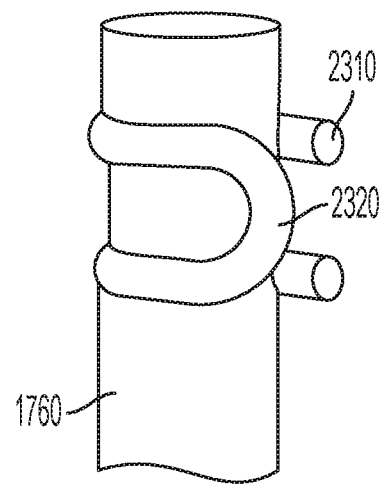
FIG. 23 shows one embodiment of a crimp on the end of bungee.
Figure 24:
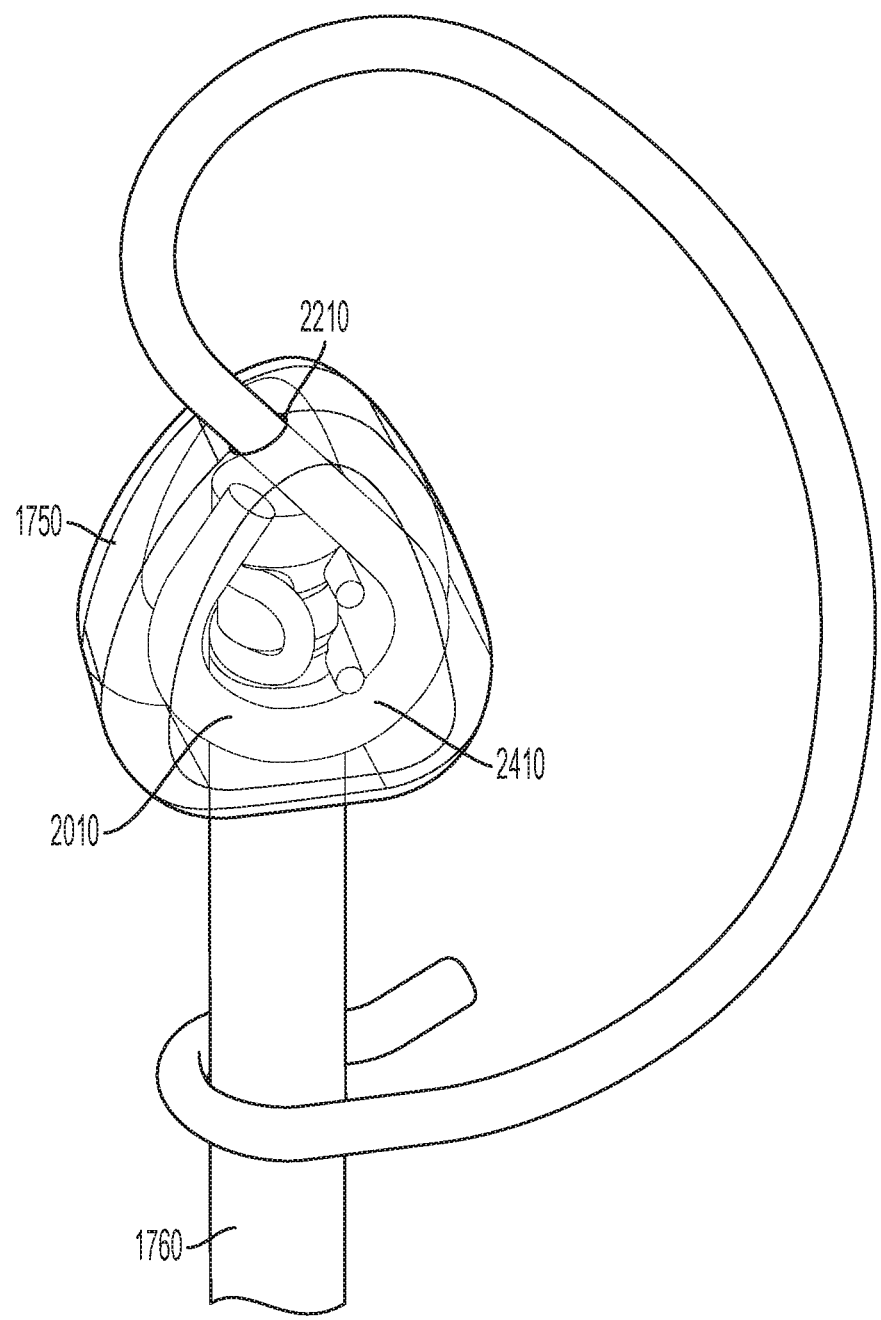
FIG. 24 shows an x-ray view of a body portion.
Figure 25:
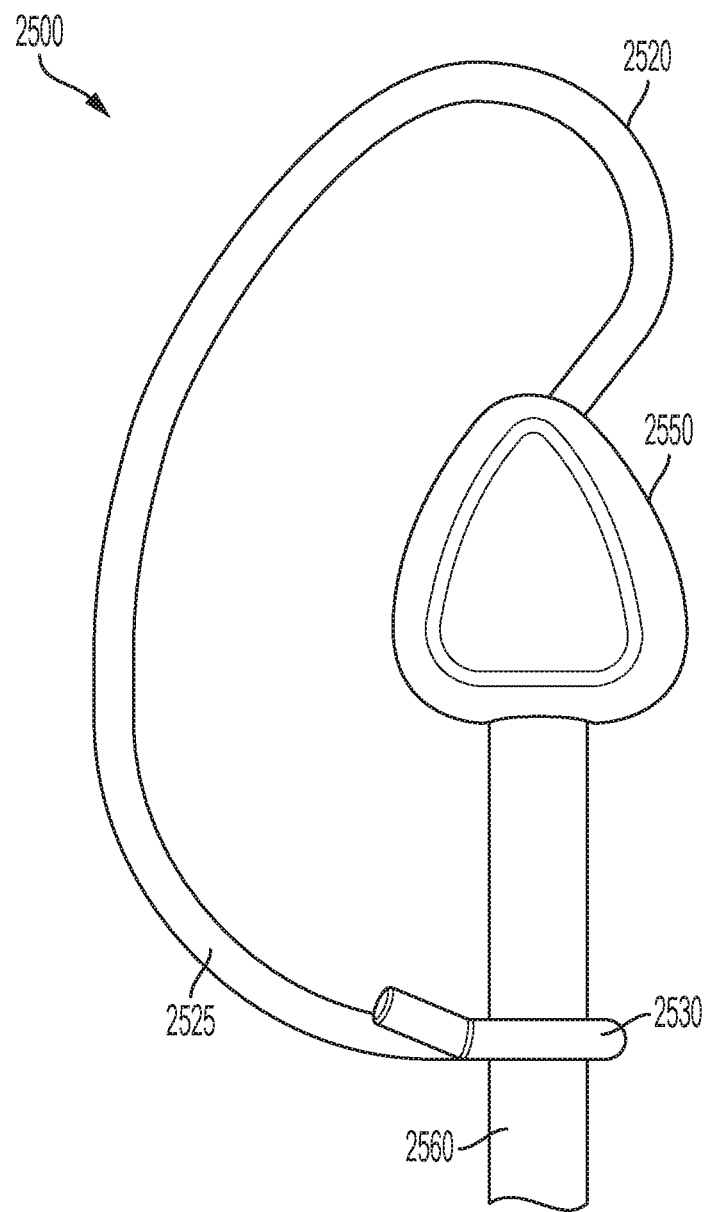
FIG. 25 shows another embodiment of the securing device.

FIG. 22 shows one embodiment of the body portion 1750. In this view, aperture 2210 is visible, through which hook 1720 passes after being overmolded. FIG. 23 shows one embodiment of a crimp on the end of bungee 1760, including rounded bend 2320 and tips 2310. FIG. 24 shows an x-ray view of body portion 1750 showing how the rounded bend 2320 and tips 2310 sit over inner loop 2010 when molded over. This secures the bungee 1760. Alternative arrangements are possible, but in many configurations the interaction between the crimp and a molded over structure of the hook enhances the security of the bungee in the body portion. FIG. 25 shows another embodiment of the securing device 2500 including a hook 2520, a body portion 2550, a lower hook portion 2525, a securing area 2530, and a bungee 2560. Similar to previous devices, this device is intended for 8 mm round bungees.

Figure 26:
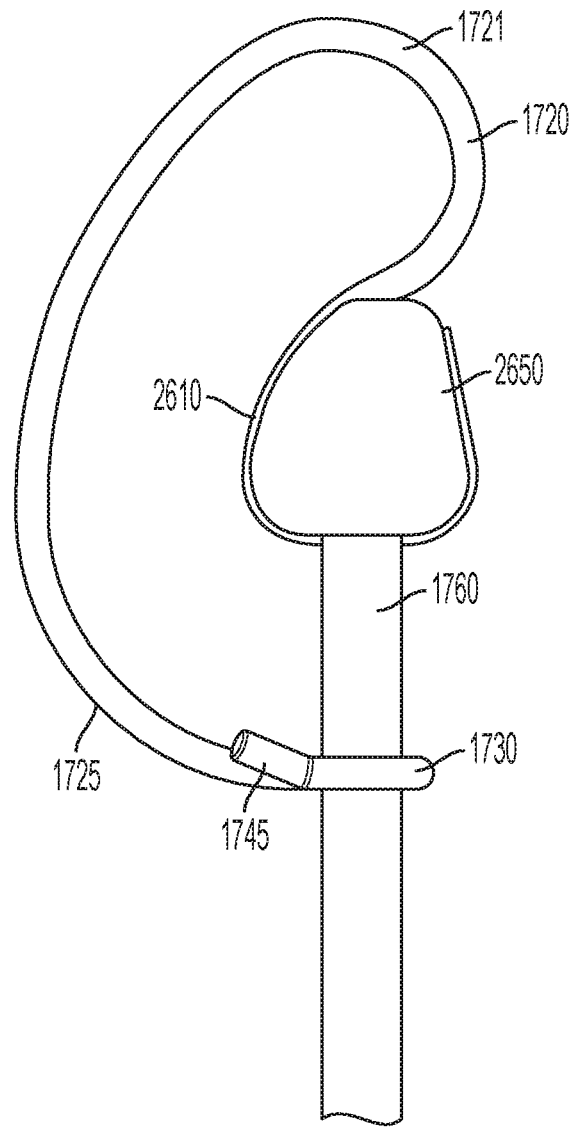
FIG. 26 shows another embodiment of a securing device.
Figure 27:
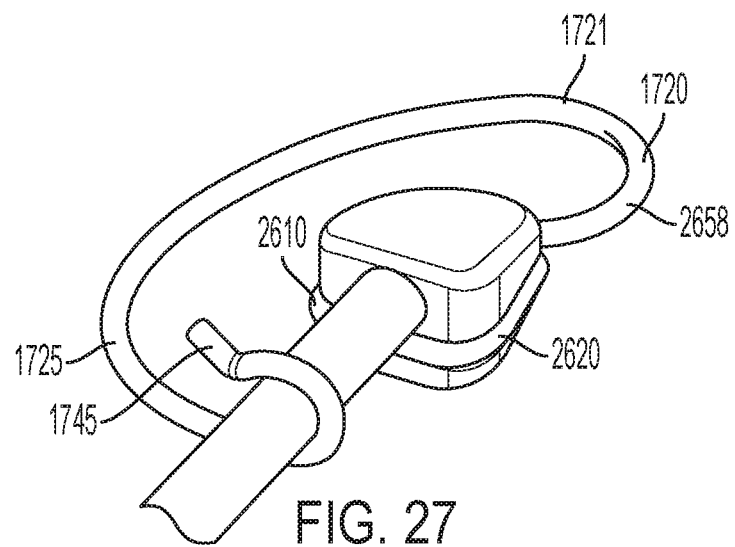
FIG. 27 shows an alternative view of the securing device of FIG. 26.

FIG. 26 shows another embodiment of a securing device 1700. Hook 1720 has been bent around body portion 2650 into groove 2610. Body portion 1750 may be formed of plastic or similar material. Alternatively, body portion 1750 may be formed of other materials such as wood or metal, or any other suitable material. Similar to as in previous embodiments, hook 1720 includes apex 1721 and includes a lower area 1725 that terminates in capture area 1730. Similar to above, the tip 1745 of the capture area 1730 is bent such that it ramps the bungee to the capture areas 1730. In this way bungee 1760 may be captured by hook 1720. FIG. 27 shows an alternative view of the securing device of FIG. 26.

Figure 28:
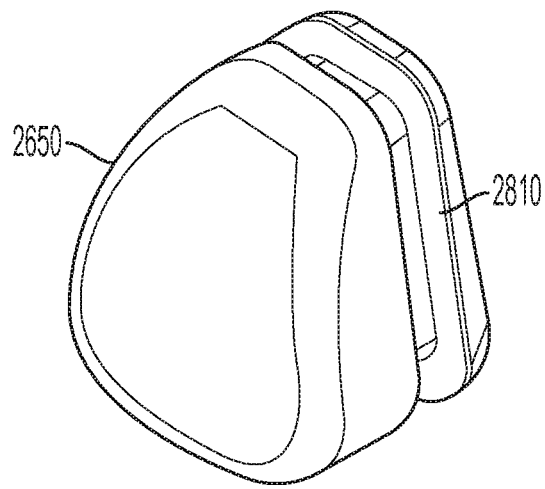
FIG. 28 shows one embodiment of a body portion for the securing device of FIG. 26.
Figure 29:
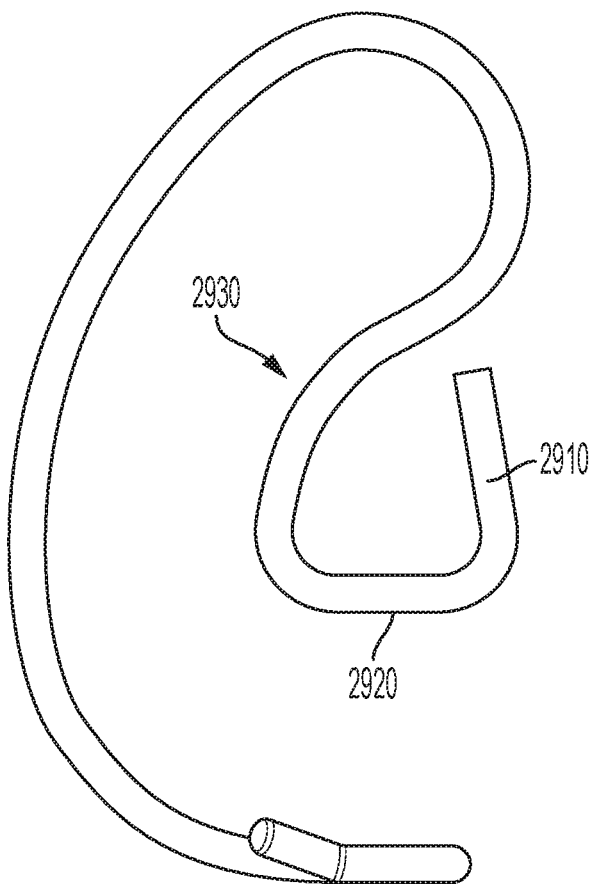
FIG. 29 shows an embodiment of the hook portion that wraps around body portion.

FIG. 28 shows one embodiment of body portion 2650. Instead of the wire passing through the body portion 2650 it is wrapped around into groove 2810. FIG. 29 shows an embodiment of the hook portion that wraps around body portion 2650. This includes side 2930, 2920, 2910. When being assembled, side 2910 may be approximately inline with side 2920. The device may then be placed around the body portion 2650 and side 2920 bent into the position shown. Many possible configurations are possible. The idea is to have a body portion that is molded around a bungee with a crimp or other attachment to assist in holding the bungee in the body, a groove in the body portion such that the hook portion may be set in the groove and bent into place.

Figure 30:
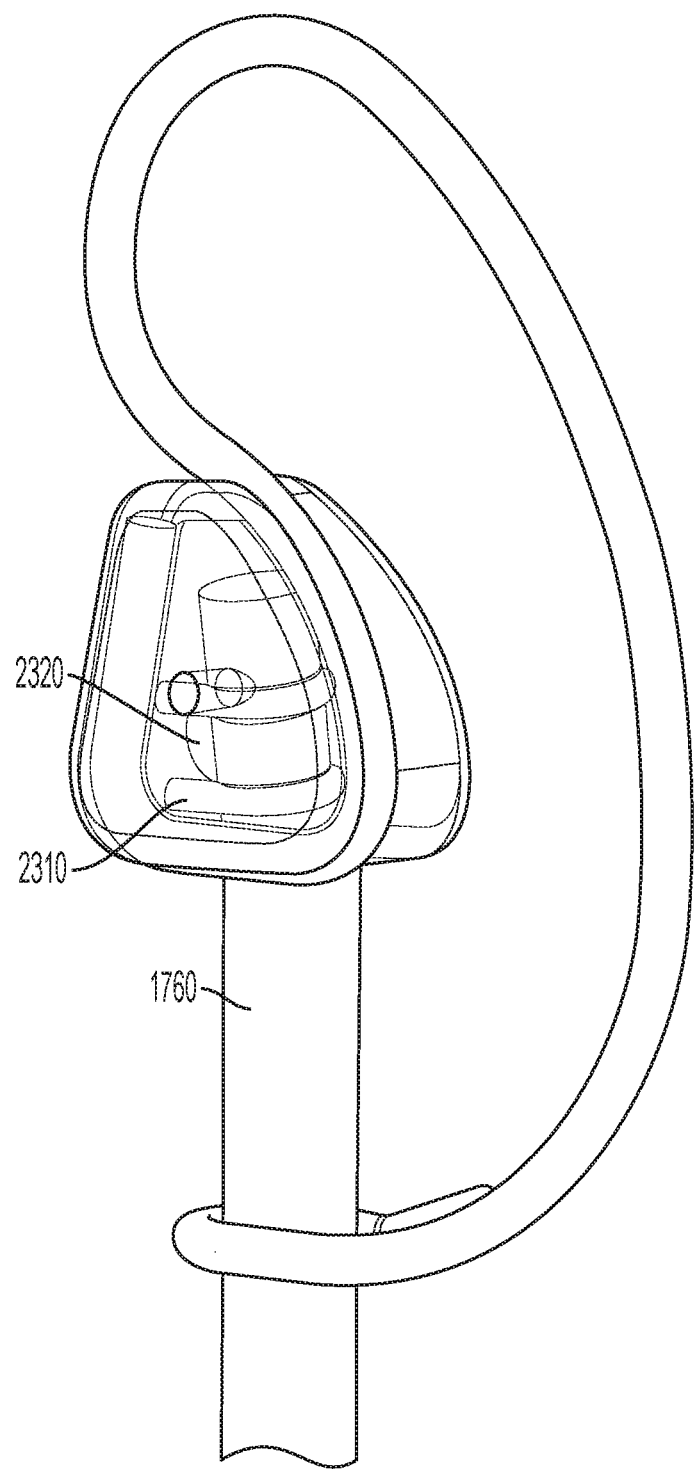
FIG. 30 shows an x-ray view of the hook bent around the body portion.

FIG. 30 shows an x-ray view of the hook bent around the body portion. As in previous configurations, the ends 2310 and bend 2320 of the wire crimp sit on top of the bottom hook portion 2920, such that the pressure of the bungee being pulled is born by the hook.

Figure 31:
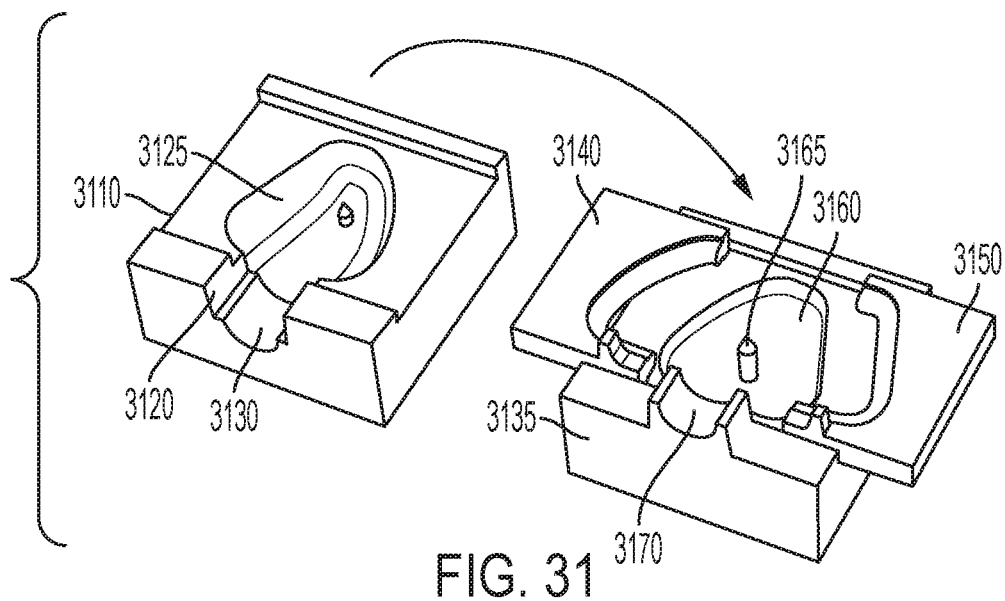
FIG. 31 shows one embodiment of a mold for making a securing device.
Figure 32:
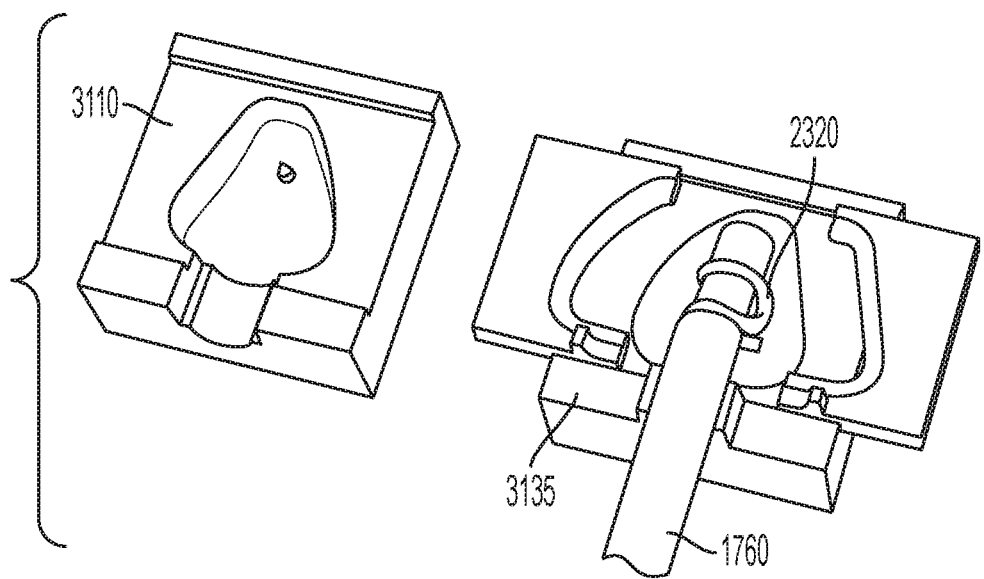
FIG. 32 shows how the bungee is first placed in the mold.
Figures 33, 34:
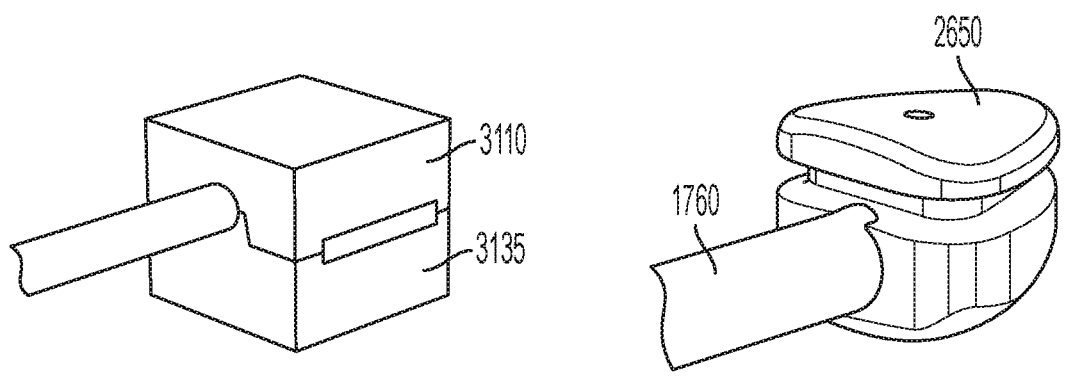
FIG. 33 shows the mold complete enclosing the body portion.
FIG. 34 shows the body portion molded around bungee.

FIG. 31 shows one embodiment of a mold for making a securing device. In this embodiment, the mold includes part 3110 which includes a recess for molding a portion of the body portion 2650 including an aperture of bungee 1760, a shelf 3210 for receiving the other half of the mold and a protrusion for holding the body portion 2650 in place as well as dispersing heat. The mold also includes portion 3135. Portion 3135 includes bungee aperture 3170, flat molding area 3160, and protrusion 3165 holding the body portion 2650 in place as well as dispersing heat and holding the bungee 1760 in place. Side slides 3140, 3150 also are slid into place to form groove 2810. FIG. 32 shows how the bungee 1760 is first placed in the mold. FIG. 33 shows the mold complete enclosing the body portion 2650. FIG. 34 shows the body portion 2650 molded around bungee 1760.

Figure 35:
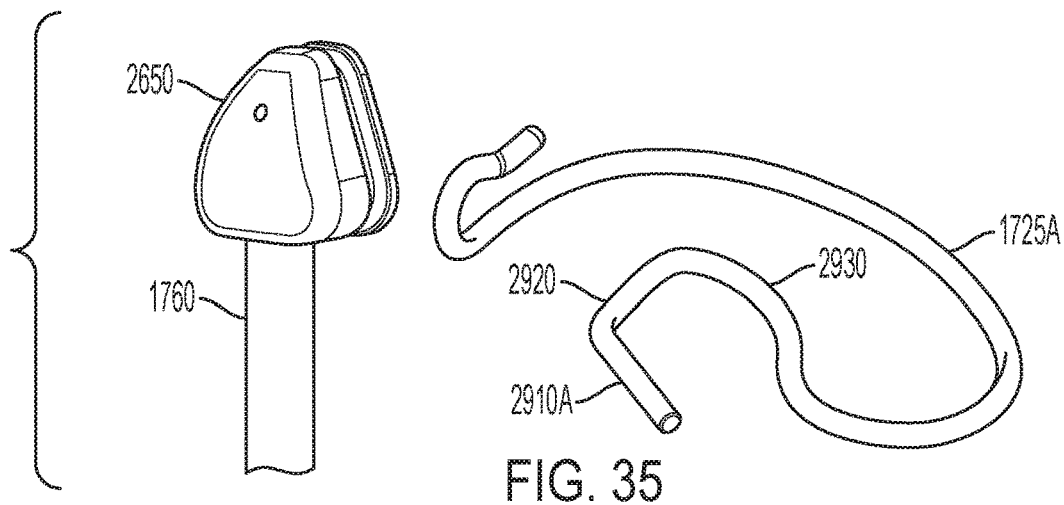
FIGS. 35-37 show one procedure for bending the hook around the body portion 2650.
Figure 36:
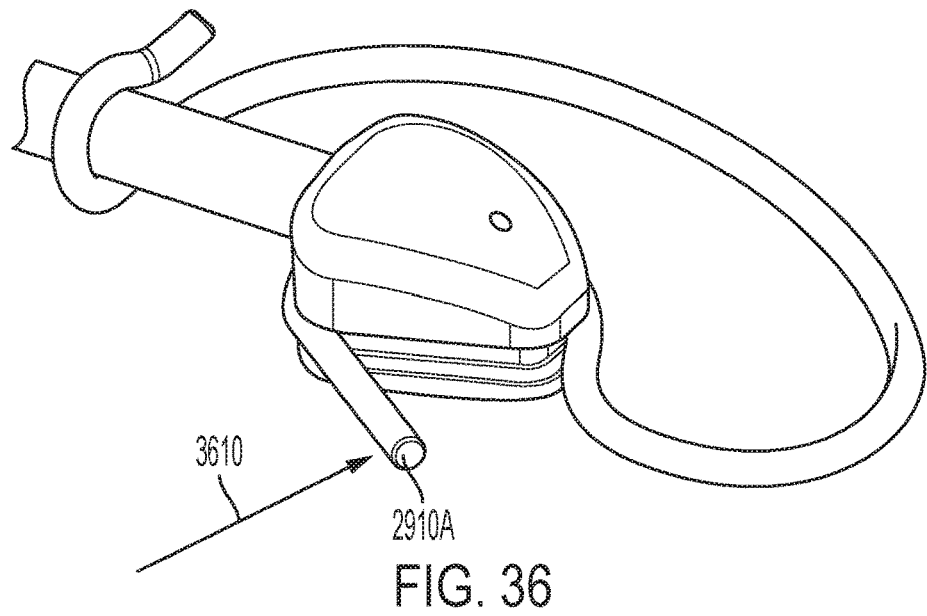
Figure 37:
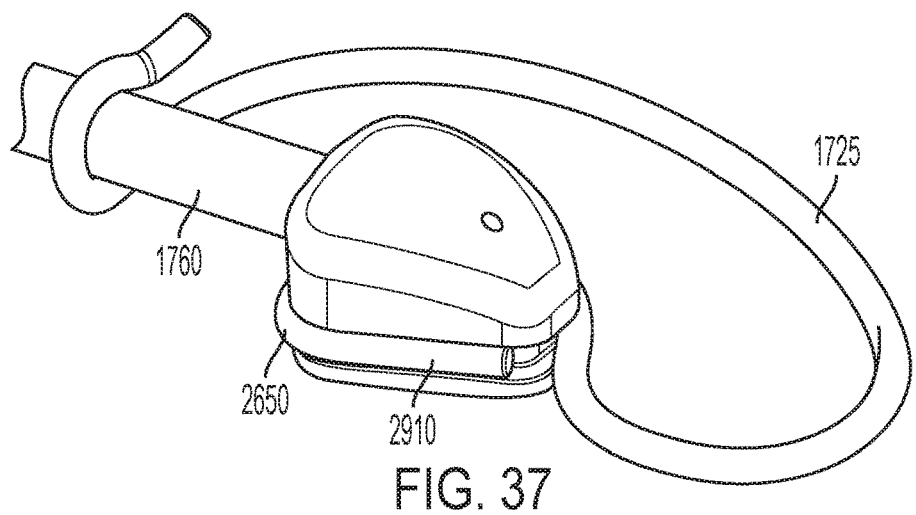
Figure 38:
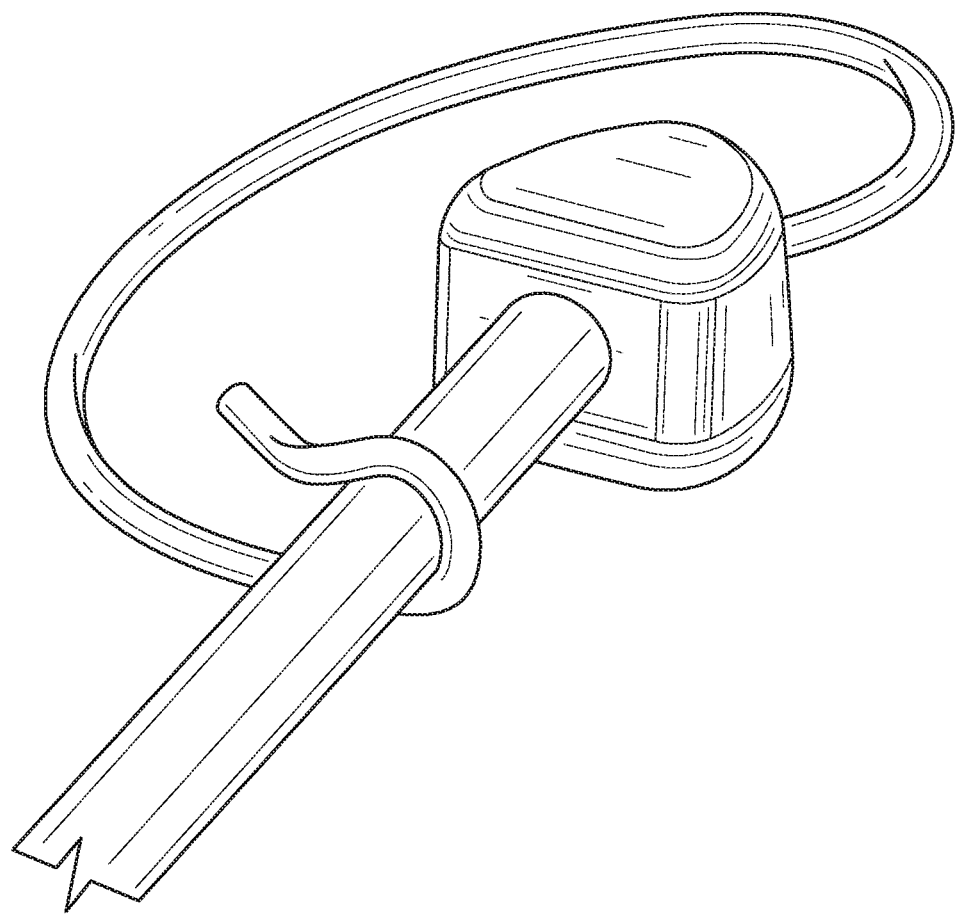
FIG. 38 shows a front perspective view of one embodiment of a securing device.
Figure 39:
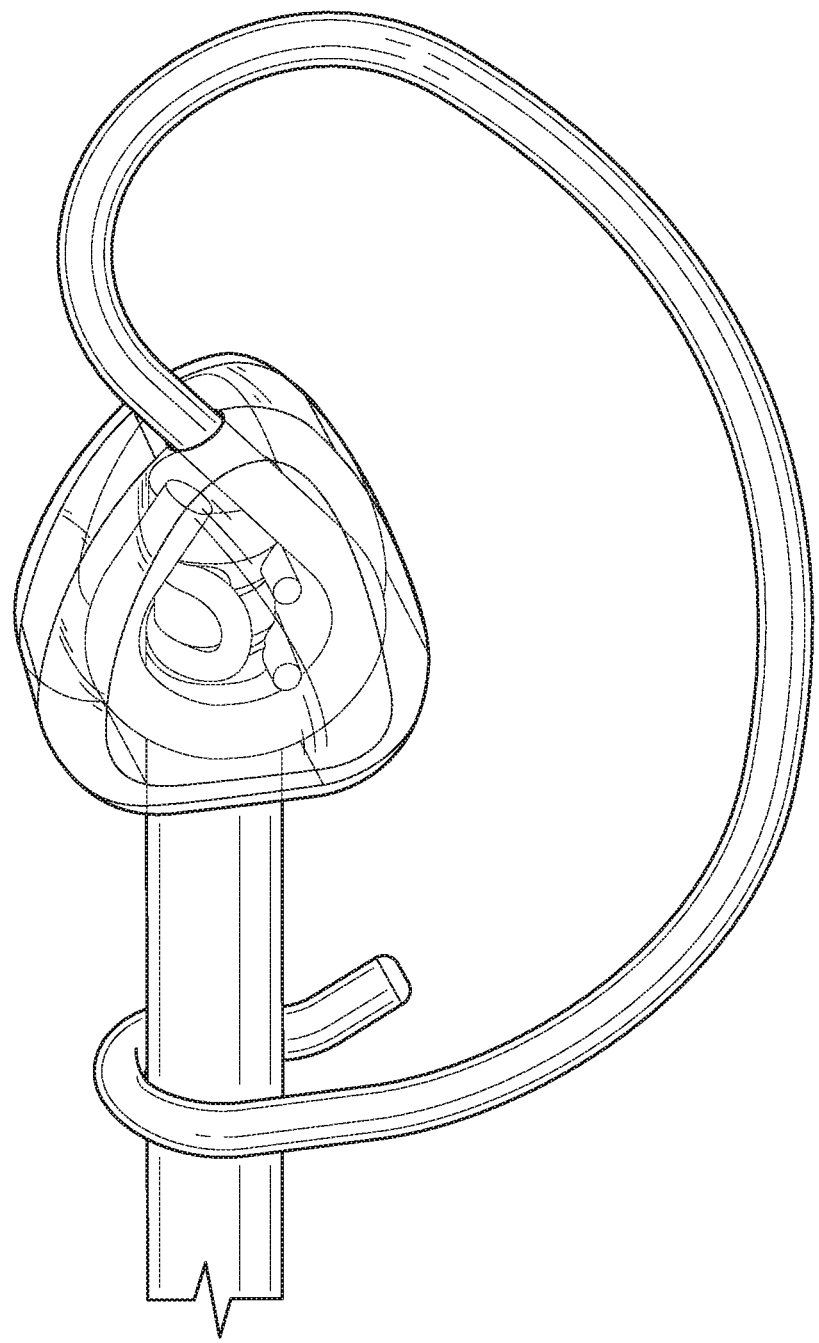
FIG. 39 shows a rear perspective view of the securing device of FIG. 38.
Figure 40:
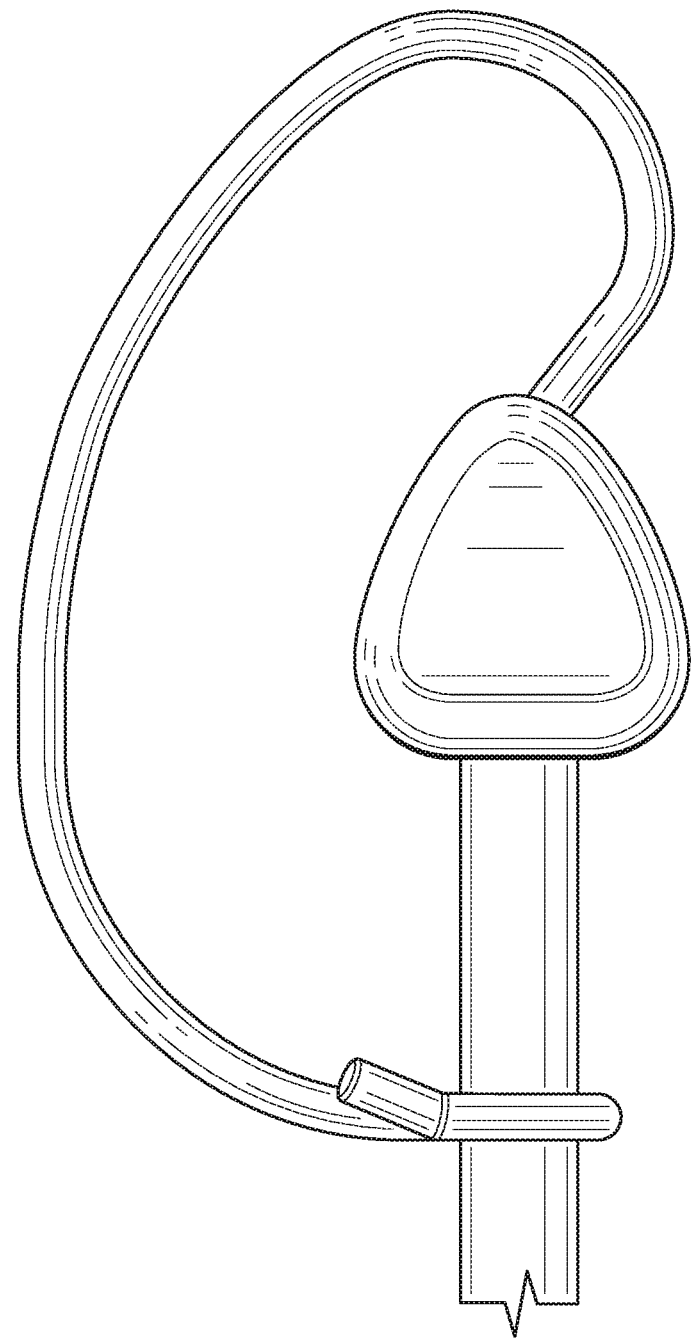
FIG. 40 shows a front view of the securing device of FIG. 38.
Figure 41:
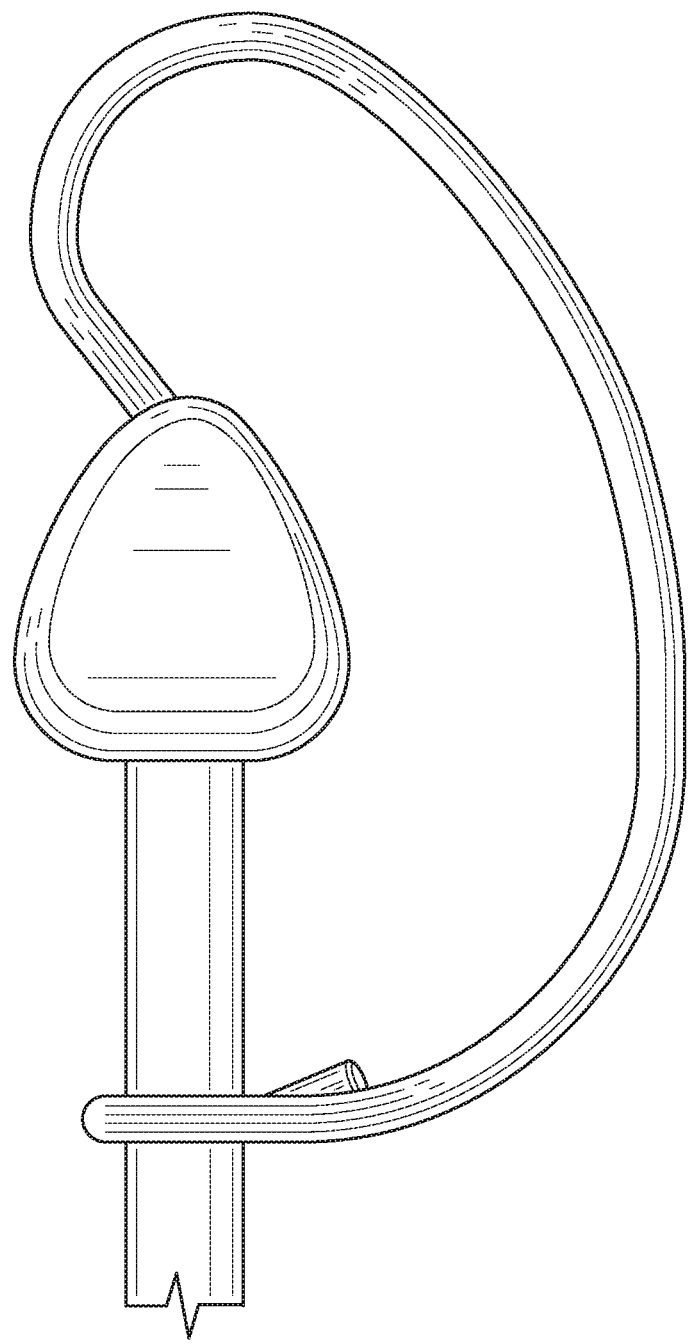
FIG. 41 shows a rear view of the securing device of FIG. 38.
Figure 42:
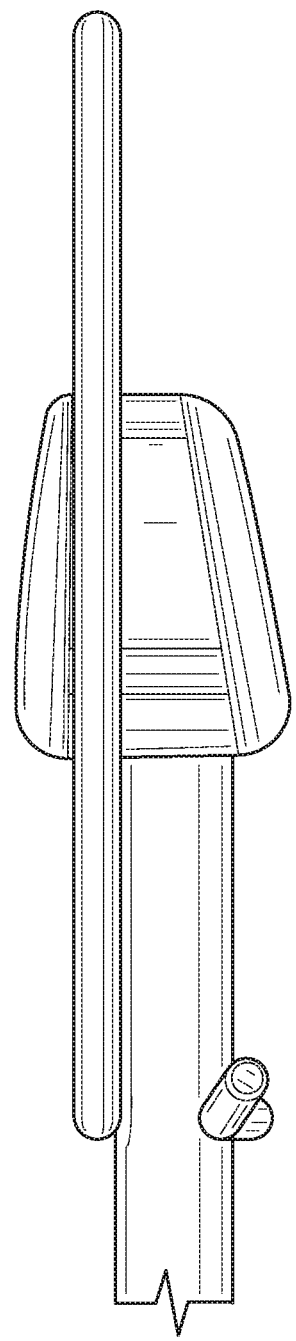
FIG. 42 shows a right side view of the securing device of FIG. 38.
Figure 43:
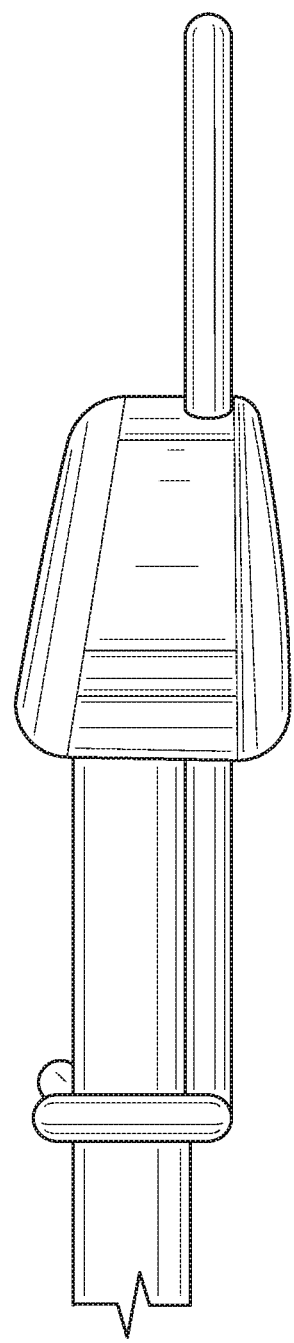
FIG. 43 shows a left side view of the securing device of FIG. 38.
Figure 44:
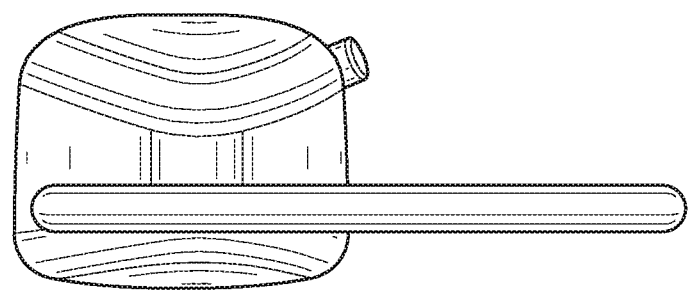
FIG. 44 shows a top view of the securing device of FIG. 38.
Figure 45:
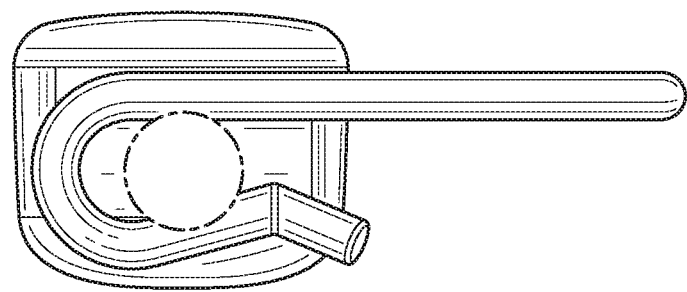
FIG. 45 shows a bottom view of the securing device of FIG. 38.
Figure 46:
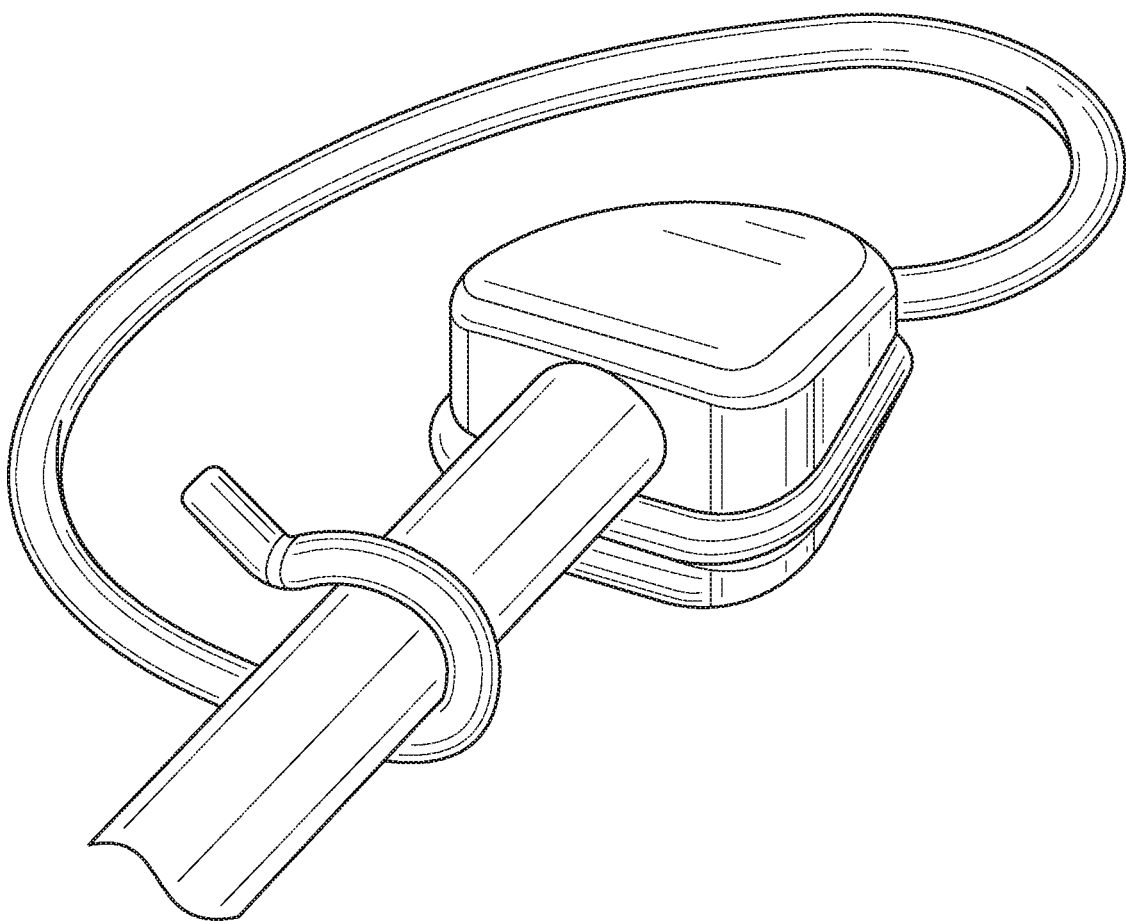
FIG. 46 shows a front perspective view of one embodiment of a securing device.
Figure 47:
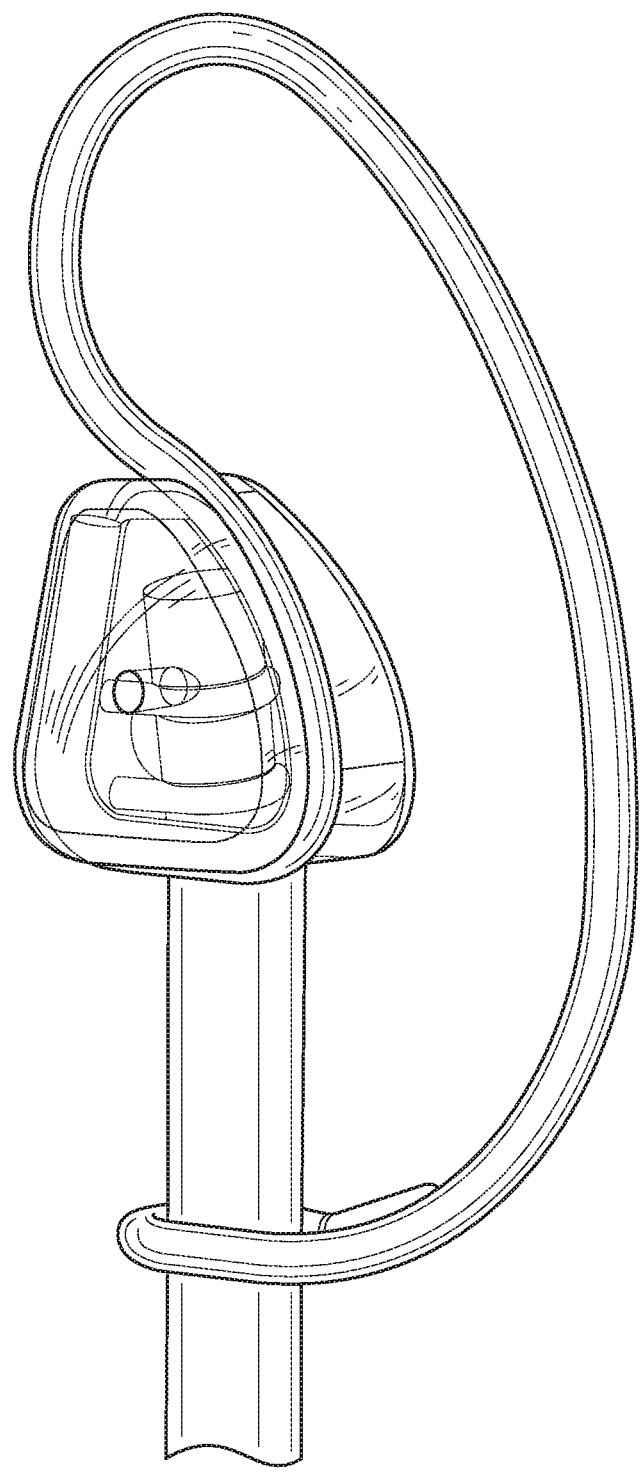
FIG. 47 shows a rear perspective view of the securing device of FIG. 46.
Figure 48:
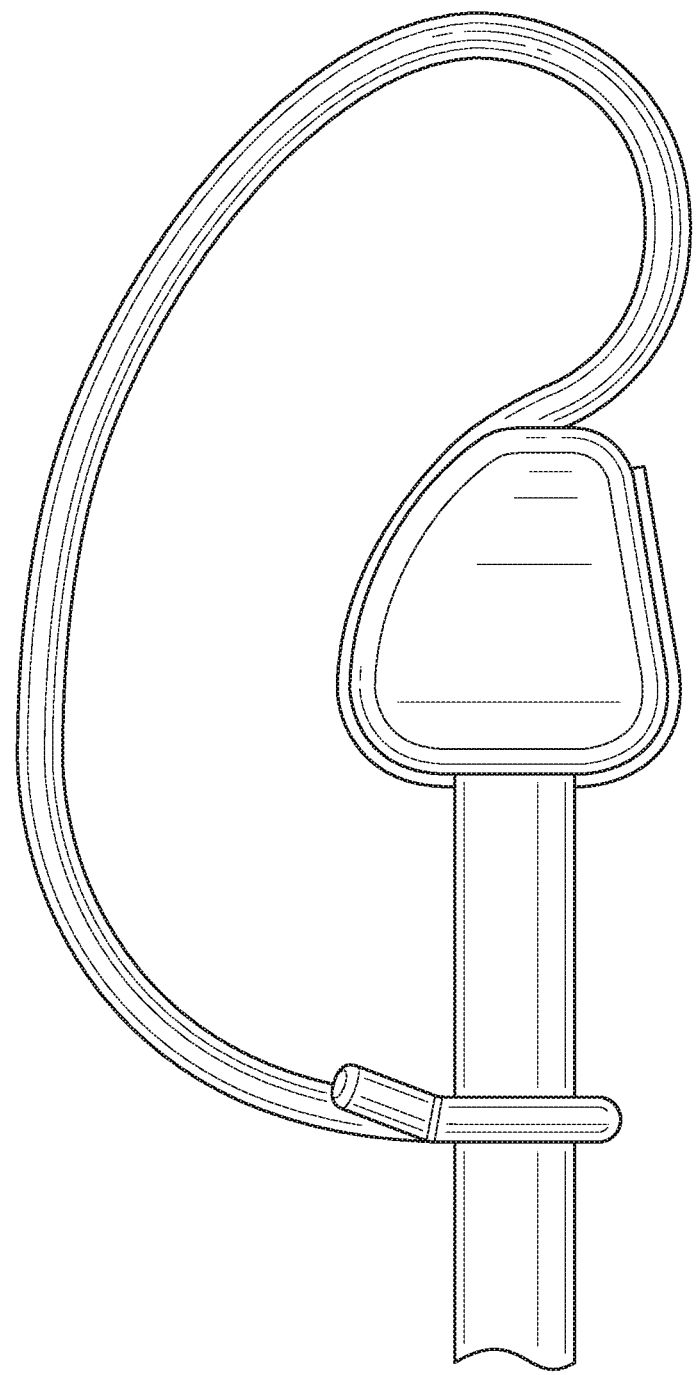
FIG. 48 shows a front view of the securing device of FIG. 46.
Figure 49:
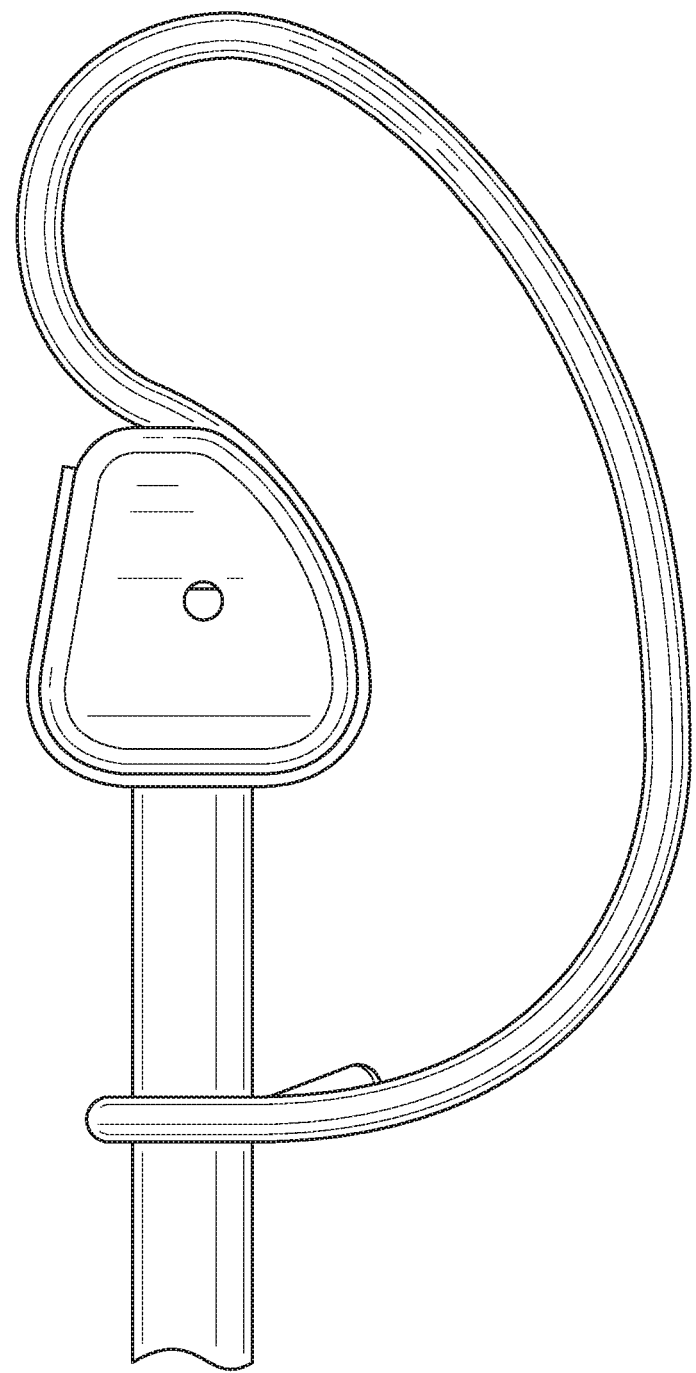
FIG. 49 shows a rear view of the securing device of FIG. 46.
Figure 50:
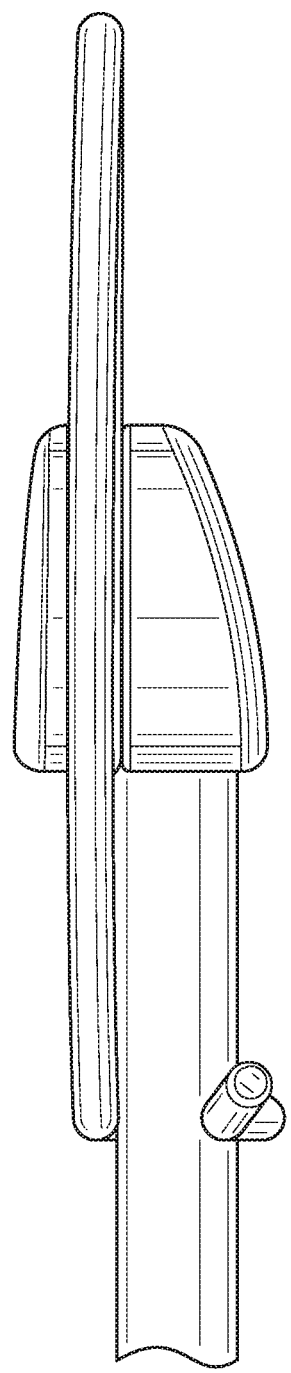
FIG. 50 shows a right side view of the securing device of FIG. 46.
Figure 51:
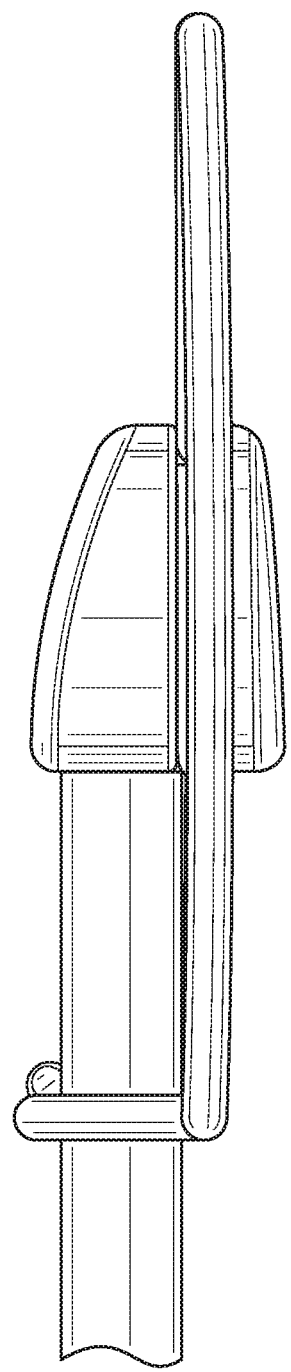
FIG. 51 shows a left side view of the securing device of FIG. 46.
Figure 52:
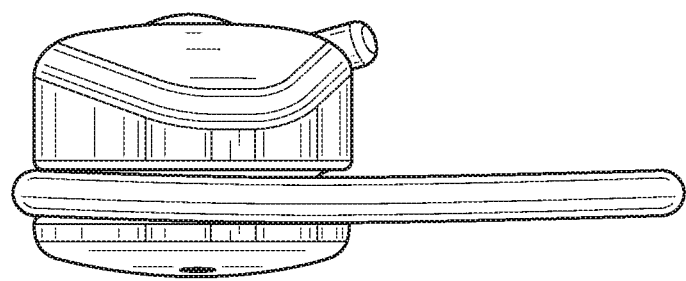
FIG. 52 shows a top view of the securing device of FIG. 46.
Figure 53:
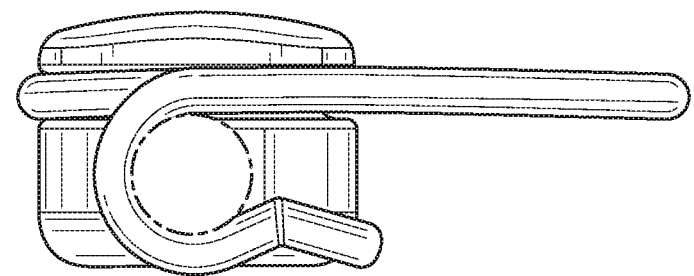
FIG. 53 shows a bottom view of the securing device of FIG. 46.

FIGS. 35-37 show one procedure for bending the hook around the body portion 2650. In FIG. 35 the pieces are separated and hook 1725A is open, in that portion 2910A is bent past 90 degrees; sufficient to receive body portion 2650. In FIG. 36, portion 2910A is bent in direction 3610. In FIG. 37 the portion 2910 is bent fully into the groove securing the hook portion around the body 2650.

Another advantage of the securing device is that the cord capturing area of the hook serves to relieve the pressure on the interface between the molded plastic cord holding body of many embodiments and the bungee or cord. In many configurations, the bungee or cord enters approximately perpendicularly to the molded plastic cord holding body. Over time, the cord may shift back and forth against the cord holding body and slowly wear away and break the plastic of the molding plastic cord holding body. In many configurations however, when the cord capture area of the hook engages the cord, the cord does not shift where the cord enters the cord holding body. This prevents wear. Essentially, the capture area of the hook maintains the cord's position in relation to the cord holding body, even if forces perpendicular to the cord are applied.

FIGS. 38-45 show one embodiment of cord holding device. FIGS. 46-53 show another embodiment of a cord holding device.

While specific embodiments have been described in detail in the foregoing detailed description, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed as new and desired to be protected by Letters Patent of the United States is:

1. A device for holding a cord, the device comprising:
a body portion configured to hold an end of a cord; and
a hook portion comprising a first end interconnected with the body portion and a second end configured to capture a body portion of the cord, the hook portion curving around a side of the body portion to position the second end of the hook portion for capturing the body portion of the cord to secure the device to an object,
wherein the first end comprises a securing portion received within the body portion, with the body portion molded around the securing portion of the hook portion.

2. The device of claim 1, wherein the body portion is molded around the end of the cord.

3. The device of claim 2, wherein the cord includes a crimp that is molded around by the body portion.

4. The device of claim 3, wherein the securing portion is oriented in the body portion such that the crimp is oriented to cross the securing portion within the body portion.

5. The device of claim 3, wherein the body portion includes a groove and a portion of the securing portion of the hook portion is oriented in the groove.

6. The device of claim 5, wherein the securing portion is bent around the body portion.

7. The device of claim 6, wherein the securing portion is oriented around the body portion such that the crimp is oriented to cross the securing portion within the body portion.

8. The device of claim 2, wherein the hook portion includes a capture area, the capture area shaped to capture the cord, the capture area located at an end of the hook portion.

9. The device of claim 8, wherein the hook portion includes an apex and the apex is inline with the capture area, such that the cord is inline with the apex.

10. A tensioning device comprising:
a cord;
a cord holding device, including:
a body portion, the body portion holding a length of the cord and comprising a groove; and
a hook portion comprising a first end interconnected with the body portion and a second end configured to capture a body portion of the cord, the hook portion curving around a side of the body portion to position the second end of the hook portion for capturing the body portion of the cord to secure the tensioning device to an object, wherein the hook portion includes a capture area, the capture area shaped to capture the cord and removably capturing the cord, the capture area located at an end of the hook portion, and wherein a securing portion of the hook portion is oriented in the groove.

11. The device of claim 10, wherein the body portion is molded around the cord.

12. The device of claim 11, wherein the cord includes a crimp that is molded around by the body portion.

13. The device of claim 12, wherein the body portion is molded around a portion of the securing portion of the hook portion.

14. The device of claim 13, wherein the securing portion is oriented in the body portion such that the crimp is oriented to cross the securing portion within the body portion.

15. The device of claim 10, wherein the securing portion is bent around the body portion.

16. The device of claim 15, wherein the securing portion is oriented around the body portion such that the crimp is oriented to cross the securing portion within the body portion.

17. The tensioning device of claim 11, wherein the hook portion includes an apex and the apex is inline with the capture area, such that the cord is inline with the apex.

18. The tensioning device of claim 11, wherein the cord is a bungee cord.

19. A method of locking down a bungee cord, the method comprising:
providing a cord holding device, including:
a cord;
a body portion, the body portion holding the cord; and
a hook portion comprising a first end interconnected with the body portion and a second end configured to capture a body portion of the cord, the hook portion curving around a side of the body portion to position the second end of the hook portion for capturing the body portion of the cord to secure the tensioning device to an object, wherein the hook portion includes a capture area, the capture area shaped to capture the cord and removably capture the cord, the capture area located at an end of the hook portion, and wherein the first end comprises a securing portion received within the body portion, with the body portion molded around the securing portion;

placing the hook portion around an anchor point; and capturing the cord in the capture area.

20. A device for holding a cord, the device comprising:

a body portion configured to hold a cord; and a hook portion comprising a first end interconnected with the body portion and a second end configured to capture a body portion of the cord, wherein the hook portion includes a capture area shaped to capture the body portion of the cord to secure the device to an object, the capture area located at an end of the hook portion, and wherein the first end comprises a securing portion received within the body portion, with the body portion molded around the securing portion of the hook portion.

21. The device of claim 20, wherein the capture area engages the cord, such that when the cord is bent, a portion of the cord entering the body portion does not shift.

22. The device of claim 21, wherein a portion of the cord enters the body portion in a first position and the capture area engages the cord, such that when the cord is bent, the cord maintains the first position.

23. The device of claim 22, wherein the first position is an angle perpendicular to an edge of the body portion.

24. A tensioning device comprising:

a cord;

a body portion, the body portion holding the cord and comprising a groove; and a hook portion comprising a securing portion, a first end interconnected with the body portion and a second end configured to capture a body portion of the cord, wherein the hook portion curves around the body portion and includes a capture area, the capture area shaped to capture the cord to secure the tensioning device to an object, the capture area located at an end of the hook portion, and wherein the securing portion is oriented in the groove.

25. The device of claim 24, wherein a portion of the cord enters the body portion in a first position and the capture area engages the cord, such that when the cord is bent, the cord maintains the first position.

26. The device of claim 25, wherein the first position is an angle perpendicular to an edge of the body portion.

27. The device of claim 24, wherein the securing portion is bent around the body portion.

28. The device of claim 24, wherein the body portion is molded around an end of the cord.

* * * * *